United States Patent [19]
Tabata et al.

[11] Patent Number: 5,452,317
[45] Date of Patent: Sep. 19, 1995

[54] METAL VAPOR LASER APPARATUS

[75] Inventors: Yoichiro Tabata; Kazuhiko Hara; Akihiko Iwata; Shigeo Ueguri; Hiroshi Masuda; Yoshibumi Minowa, all of Hyogo, Japan

[73] Assignee: Mitsubishi Denki Kabushiki Kaisha, Tokyo, Japan

[21] Appl. No.: 310,093

[22] Filed: Sep. 22, 1994

Related U.S. Application Data

[63] Continuation of Ser. No. 972,204, Nov. 5, 1992, abandoned.

[30] Foreign Application Priority Data

Nov. 7, 1991 [JP] Japan .................. 3-291334
Jun. 17, 1992 [JP] Japan .................. 4-157667
Jul. 10, 1992 [JP] Japan .................. 4-183748

[51] Int. Cl.$^6$ ............................................. H01S 3/22
[52] U.S. Cl. ................................. 372/60; 372/69; 372/29
[58] Field of Search ................ 372/58, 59, 60, 34, 372/56

[56] References Cited

U.S. PATENT DOCUMENTS

| | | | |
|---|---|---|---|
| 3,761,838 | 9/1973 | Bhaumik et al. | |
| 3,813,612 | 5/1974 | Schriever et al. | 372/60 |
| 4,065,731 | 12/1977 | Wang . | |
| 4,126,890 | 11/1978 | Fournier et al. | |
| 4,203,078 | 5/1980 | Daugherty et al. | 372/57 |
| 4,417,340 | 11/1983 | Horiuchi et al. | 372/60 |
| 4,646,311 | 2/1987 | Nighan et al. | 372/60 |
| 4,821,280 | 4/1989 | Vawase | 372/56 |
| 4,876,690 | 10/1989 | Nishida et al. | 372/56 |
| 4,955,033 | 9/1990 | Maitland et al. | 372/56 |
| 5,090,020 | 2/1992 | Bedwell | 372/57 |
| 5,117,434 | 5/1992 | Oohashi et al. | 372/34 |
| 5,150,375 | 9/1992 | Tabata et al. | 372/56 |

FOREIGN PATENT DOCUMENTS

| | | |
|---|---|---|
| 2904409 | 8/1979 | Germany . |
| 1087803 | 10/1967 | United Kingdom . |
| 1108827 | 4/1968 | United Kingdom . |
| 1205204 | 9/1970 | United Kingdom . |
| 1548333 | 7/1979 | United Kingdom . |
| 1601366 | 10/1981 | United Kingdom . |
| 2198283 | 6/1988 | United Kingdom . |

OTHER PUBLICATIONS

Patent Abstracts of Japan, vol. 14, No. 333 (E-955) (4287) JP-2-117189, Jul. 25, 1990.
Patent Abstracts of Japan, vol. 015, No. 110 (E-1046) JP-3-003383, Jan. 9, 1991.
Z. Huang et al., "Influence of Molecular Gases on the Output Characteristics of a Copper Vapor Laser", Japanese Journal of Applied Physics, vol. 25, No. 11, Nov. 1986, pp. 1677–1679.
P. A. Bokhan et al., "Mechanism of Laser Action in Copper Vapor", Sov. J. Quant. Electron, vol. 3, No. 6, May–Jun. 1974, pp. 481–483.
M. A. Lesnoi, "Influence of the Gas Mixture Composition and Cathode Material on the Output Power of a Copper Vapor Laser", Sov. J. Quantum Electron, 14(1), Jan. 1984, pp. 142–144.

Primary Examiner—Leon Scott, Jr.
Attorney, Agent, or Firm—Burns, Doane, Swecker & Mathis

[57] ABSTRACT

A metal vapor laser apparatus is provided with a buffer gas and a laser medium are enclosed in a tube and the gas is utilized as an excitation or ionization medium in the tube. The metal vapor laser apparatus comprises molecules consisting of a plurality of elements and mixed by at least 0.1% in the gas enclosed in the tube and a gas having a molecular weight lighter than that of neon mixed by at least 0.1% in the gas enclosed in the tube.

28 Claims, 20 Drawing Sheets

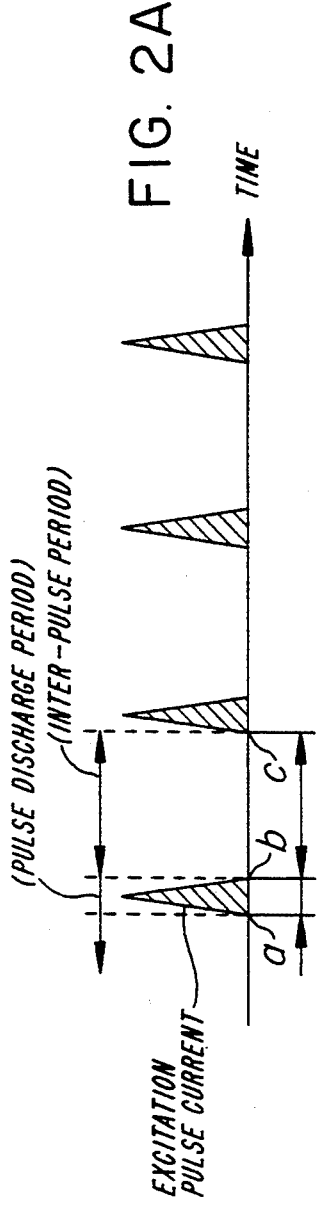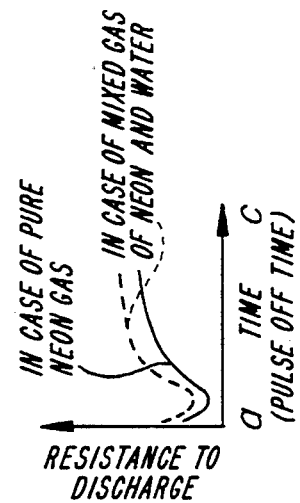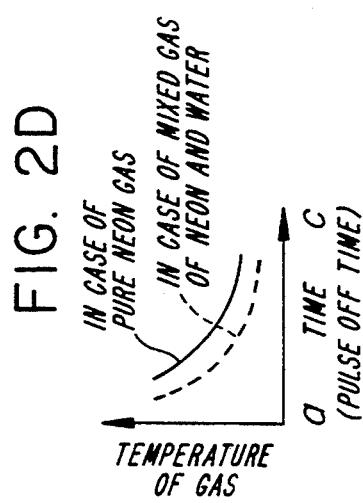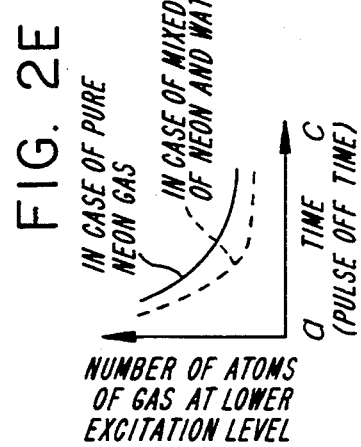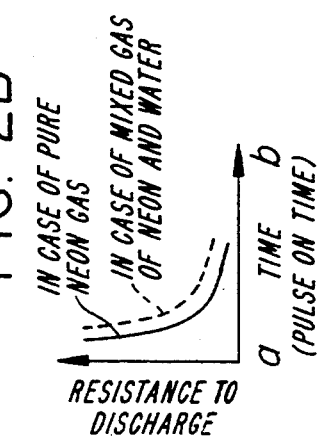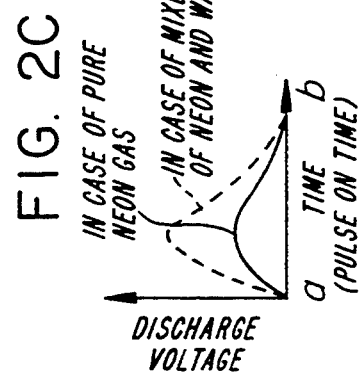

FIG. 30
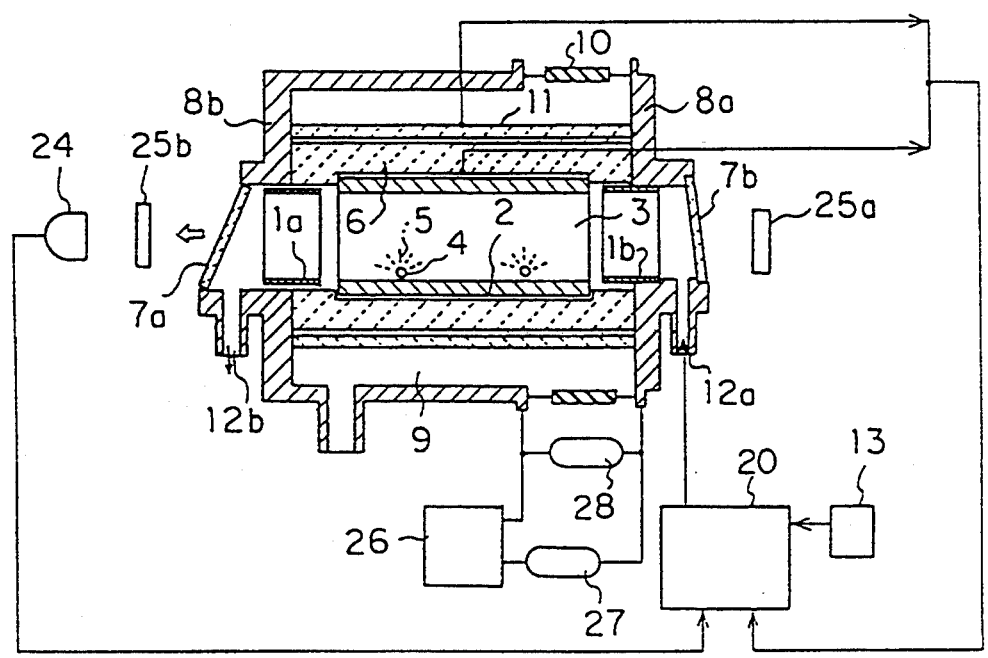
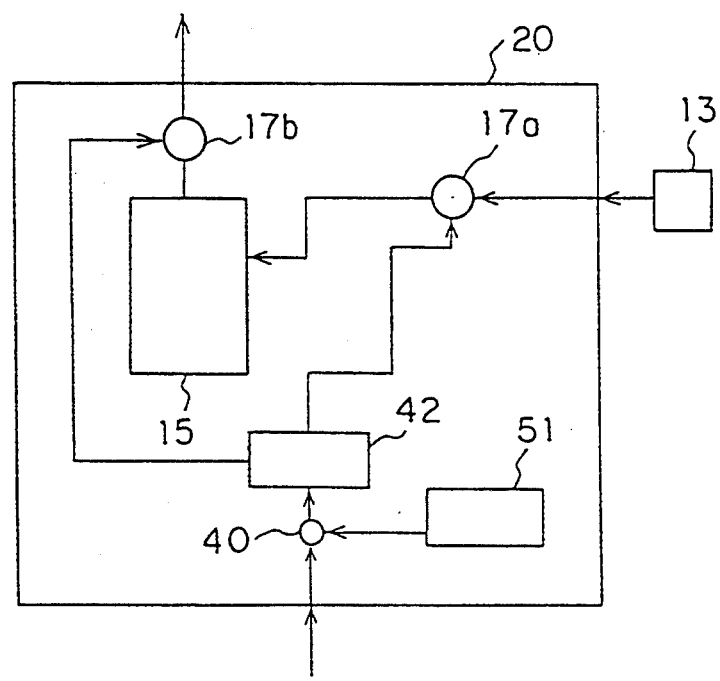

METAL VAPOR LASER APPARATUS

This application is a continuation of application Ser. No. 07/972,204, filed Nov. 5, 1992 now abandoned.

BACKGROUND OF THE INVENTION

1. Field of the Invention

This invention relates to a pulse laser apparatus which makes use of gas as an excitation or ionization medium, and more particularly to a mixture of gas which serves as buffer gas for an excitation or ionization medium and control of a laser of a pulse laser apparatus of the type mentioned.

2. Description of the Prior Art

An excimer laser, a metal vapor laser, a TEACO2 laser, a nitrogen laser and so forth are used as pulse laser apparatus which make use of gas as an excitation or ionization medium. An exemplary one of conventional pulse laser apparatus is disclosed, for example, in *Collection of Speech Drafts for the Sixth Annual Conference of the Laser Society*. No. 21aB3, 1986 and is shown in sectional view in FIG. 1. The conventional pulse laser apparatus shown in FIG. 1 is constructed as a copper vapor laser apparatus which is a kind of metal vapor laser apparatus. Referring to FIG. 1, reference characters 1a and 1b denote electrodes for causing a discharge, reference numeral 2 denotes a discharge tube, 3 a discharge spacing for exciting copper vapor, 4 copper for generating copper vapor therefrom, 5 copper vapor, 6 an insulator member, reference characters 7a and 7b denote resonance mirrors for causing laser oscillation, 8a and 8b flanges for making up an enclosed spacing, reference character 9 denotes a vacuum layer, 10 an insulator tube, 11 an enclosing tube, 12a a gas inlet port and 12b a gas outlet port.

Subsequently, operation will be described. A pulse voltage is applied between the electrodes 1a and 1b to cause discharging in the discharge spacing 3 in which gas is enclosed. The gas in the discharge spacing 3 is heated by the acceleration energy of ions and electrons are generated by the discharging to evaporate the copper 4. The electrons to which high acceleration energy has been provided by the pulse discharge thus collide with the copper vapor 5, whereupon they give the energy thereof to the copper vapor 5 to excite the copper vapor 5 to a higher excitation level of a laser oscillation line. The insulator member 6 plays the role of intercepting the heat from the discharge spacing 3 in order to maintain the discharge spacing 3 at a predetermined copper vapor concentration. Meanwhile, the vacuum layer 9 plays the same role as the insulator member 6 and particularly intercepts the radiation heat. When the copper vapor 5 excited to the higher excitation level of the oscillation line transits to a lower excitation level, light is generated. The light thus generated is optically amplified by the resonance mirrors 7a and 7b and outputted as laser light to the outside so that it is utilized in various industrial fields such as, for example, for laser working. The gas is supplied from a gas supplying apparatus through the gas inlet port 12a into the discharge spacing 3 and then discharged through the gas outlet port 12b.

The conventional copper vapor laser apparatus is constructed in such a manner as described above, and using a laser medium in the form of a mixture of neon gas serving as buffer gas and copper vapor, the copper vapor laser apparatus effects pulse oscillation by flowing excitation pulse current through the discharge tube as shown in FIG. 2(A). Here, if the power to be introduced into the discharge spacing is increased by an increase of the electric input of excitation pulses or by an increase of the frequency of pulses, then the temperature of the gas rises so that charged particles may be produced by an excessively great amount in the discharge spacing. Consequently, as seen from the solid line FIG. 2(B), the resistance to discharging decreases quickly for a pulse on period for which a pulse is present, and as seen from the solid line FIG. 2(C), the discharge voltage applied to the discharge medium does not increase in proportion to an increase of the electric input. As a result, the number of electrons which have the high energy necessary to excite the copper vapor to the higher excitation level of the oscillation line does not increase in proportion to an increase of the electric input for the pulse on period, and the rate at which the copper vapor can be excited to the higher excitation level does not increase. Accordingly, there is a problem that the gain of the laser does not increase but becomes saturated.

Further, if the electric input to be introduced into the discharge spacing is increased, then the discharge current flowing through the discharge spacing further increases due to a decrease of the resistance to the electric input for a pulse on period as seen from the solid line of FIG. 2(D), and consequently, the numbers of ions and electrons remaining in the discharge spacing for a pulse off period subsequent to the pulse on period are increased. As a result, the temperature of the gas for the pulse off period becomes so high that the number of copper vapor atoms at the lower excitation level of the laser oscillation line which directly have a bad influence on oscillation immediately before introduction of an excitation pulse is increased as seen from the solid line of FIG. 2(E). As a result, there is a problem that, since the gain of the laser increases in proportion to a difference between the number of copper vapor atoms at the higher excitation level and the number of copper vapor atoms at the lower excitation level, the gain of the laser, is reduced by an increase of the number of copper vapor atoms at the higher excitation level.

Further, if the temperature of the gas for a pulse off period is high, the resistance to the discharge immediately before introduction of an excitation pulse is low as seen from the FIG. 2(F). The influence of the reduction of the resistance continues to a next pulse on period, and the discharge resistance upon pulse discharge is decreased and the discharge voltage applied to the resistance of the discharge is decreased. As a result, there is a problem that the number of electrons having energy necessary to excite copper vapor to a higher excitation level of the oscillation line is decreased for the pulse on time, and the rate at which the copper vapor can be excited to a higher excitation level is decreased, and consequently, the gain of the laser is decreased.

The conventional laser apparatus further has problems in stability, deterioration of the quality of a laser beam and so forth such that the laser medium is deteriorated by impurities or the like and the laser output is reduced.

SUMMARY OF THE INVENTION

The present invention has been made to eliminate such problems as described above, and it is an object of the present invention to provide a pulse laser apparatus which achieves an increase and stabilization of the laser output by applying, to buffer gas to be supplied into a discharge spacing, means for increasing the resistance of the laser medium for a pulse on period or for a pulse off period so as to increase the concentration of atoms to be excited to a higher excitation level of an oscillation line for a pulse on period.

It is another object of the present invention to provide a pulse laser apparatus which achieves, when the pulse laser apparatus is of the type wherein the concentration of atoms at a lower excitation level of an oscillation line for a pulse off period depends upon the temperature of gas such as a copper vapor laser apparatus, an increase and stabilization of the laser output by decreasing the temperature of the gas for a pulse off period rapidly to decrease the concentration of atoms at the lower excitation level to increase the laser output.

In order to attain the objects, according to a first aspect of the present invention, a pulse laser apparatus wherein buffer gas and copper vapor are enclosed in a tube and the gas is utilized as an excitation or ionization medium in the tube comprises molecules consisting of a plurality of elements and mixed by 0.1 percent or more in the gas enclosed in the tube.

According to a second aspect of the present invention, a pulse laser apparatus comprises molecules consisting of a plurality of elements and mixed by 0.1 percent or more in gas enclosed in a tube, and gas of light atoms lighter than atoms constituting the buffer gas such as hydrogen, helium or deuterium and mixed by 0.1 percent or more in the gas enclosed in the tube.

According to a third aspect of the present invention, a pulse laser apparatus is constructed such that, in the first and second aspects, a substance in which molecules consisting of a plurality of elements or gas of light atoms is impregnated is disposed in the tube as means for mixing the molecules consisting of a plurality of elements or the gas of light atoms into the buffer gas.

According to a fourth aspect of the present invention, a pulse laser apparatus is constructed such that a vessel in which liquid in the form of molecules consisting of a plurality of elements is contained is disposed on a route for supplying the gas into the tube so that the gas may be supplied into the tube by way of the vessel.

According to a fifth aspect of the present invention, a pulse laser apparatus is constructed such that, in the fourth aspect, the liquid such as water in the vessel is automatically supplemented.

According to a sixth aspect of the present invention, a pulse laser apparatus is constructed such that means for controlling the amount of vapor of molecules consisting of a plurality of elements or the amount of gas of light elements in the gas is provided on a route for supplying the gas into the tube.

According to a seventh aspect of the present invention, a pulse laser apparatus is constructed such that, in the sixth aspect, a detector for detecting the amount of impurity gas other than the gas enclosed in the tube is provided in the tube or at an exit for the gas in the tube, and the detected amount of impurity gas in the gas is fed back to means for controlling the amount of vapor of molecules consisting of a plurality of elements or the amount of gas of light atoms in the gas enclosed in the tube in accordance with an increase or decrease of the detected amount of impurity gas in the gas.

According to an eighth aspect of the present invention, a pulse laser apparatus is constructed such that, in the sixth aspect, a laser output, a discharge current, a discharge voltage or an internal temperature of the tube is detected and is fed back to means for controlling the amount of vapor of molecules consisting of a plurality of elements or the amount of gas of light atoms in the gas enclosed in the tube in accordance with a value of difference between the detected signal value and a preset aimed value.

According to a ninth aspect of the present invention, a pulse laser apparatus is constructed such that, in the first or second aspect, means for cooling the inside of the tube serves also as means for supplying molecules consisting of a plurality of elements into the tube.

According to a tenth aspect of the present invention, a pulse laser apparatus comprises a pipe provided in a tube and having a hole formed in a side face thereof, and means for supplying gas in the form of a mixture of buffer gas with molecules consisting of a plurality of elements or gas of light atoms into the tube through the hole of the pipe.

According to an eleventh aspect of the present invention, a pulse laser apparatus comprises means for supplying gas in the form of a mixture of buffer gas with molecules consisting of a plurality of elements or gas of light atoms into the tube by way of one or a plurality of inlet ports formed at a central portion of the tube in its axial direction.

According to a twelfth aspect of the present invention, a pulse laser apparatus is constructed such that, in the tenth aspect, it further comprises a pipe provided at a central portion in the tube in its radial direction and having a hole formed in a side face thereof, and means for supplying gas in the form of a mixture of buffer gas with molecules consisting of a plurality of elements or gas of light atoms into the tube through the hole of the pipe.

According to a thirteenth aspect of the present invention, a pulse laser apparatus comprises means for detecting an intensity of light emitted by discharging, and means for controlling the amount of vapor of molecules consisting of a plurality of elements or the amount of gas of light atoms in the gas enclosed in the tube in accordance with an intensity of light having a wavelength in the proximity of an oscillation frequency of the laser apparatus.

According to a fourteenth aspect of the present invention, a pulse laser apparatus comprises means for detecting a laser output only of the laser wavelength of 510 nm, and means for controlling the amount of vapor of molecules consisting of a plurality of elements or the amount of gas of light atoms in the gas enclosed in the tube in accordance with an increase or decrease of the detected signal value.

According to a fifteenth aspect of the present invention, a pulse laser apparatus comprises means for detecting intensities of a laser output at least at two different points in a radial direction, and means for controlling the amount of vapor of molecules consisting of a plurality of elements of the amount of gas of light atoms in the gas enclosed in the tube in accordance with an increase of decrease of a gradient of the detected laser output intensities in the radial direction.

According to a sixteenth aspect of the present invention, a pulse laser apparatus comprises means for stopping mixture of vapor of molecules consisting of a plurality of elements upon stopping of the apparatus 0F upon stopping of laser oscillation, and/or means for stopping supply of the gas into the discharge tube upon stopping of laser oscillation.

With the pulse laser apparatus according to the first aspect of the present invention, vapor of molecules consisting of a plurality of elements such as water is mixed by 0.1 percent or more in the mixture gas which contains rare gas such as neon and a laser medium such as copper vapor therein. Thus, it has become clear that the temperature of the gas heated to a high temperature by pulse discharge is dropped by conducting heat away from the gas by heat of dissociation and so forth of the molecules consisting of a plurality of elements such as water for a pulse rest period. Further, conveyance of heat to the wall of the apparatus is performed effectively by means of the thus dissociated light atoms and charged particles cause the dissociated light atoms to be coupled again by the vapor of molecules consisting of a plurality of elements such as water, and act to increase the resistance of the laser medium for a pulse on period compared with the case of pure neon gas. An increase of the discharge voltage applied across the resistance of the laser medium or a decrease of the particle concentration of atoms at a lower excitation level will act to increase the laser output. FIG. 3 shows a laser output ratio characteristic when water is employed as particles consisting of a plurality of elements. Referring to FIG. 3, the electric input is an electric power accumulated in a capacitor in a power source for generating excitation pulses (in the apparatus at present, part of the electric input is dissipated in the discharge spacing). When the characteristic curved shows a characteristic of pure neon gas, the characteristic curve e shows a characteristic of a mixture of vapor water in pure neon gas. In FIG. 3, the laser output (output ratio) is 1 with the laser output of pure neon gas at the electric input of 14.4 kW. When pure neon gas is used, if the electric input is increased from 10 kW to 14.4 kW, then the laser output increases monotonically, but in this instance, the discharge voltage applied across the resistance of the laser medium does not increase for a pulse on period with respect to an increase of the electric energy. The increase of the laser output in this instance arises not from an increase of the discharge voltage but rather from an increase of the length of a high temperature region of the discharge spacing in which copper vapor can exist in the axial direction, in short, an increase of the volume of the laser medium. If vapor of water is mixed-into the pure neon gas, then it acts to increase the discharge voltage in addition to an increase of the volume of the laser medium described above, and at the electric input of 14.4 kW, the laser output is increased further by 30 percent compared with the case wherein only pure neon gas is involved.

With the pulse laser apparatus according to the second aspect of the present invention, in the gas which contains buffer gas such as neon and a laser medium such as copper vapor therein, vapor of molecules consisting of a plurality of elements such as water and gas of light atoms which are lighter than atoms constituting the buffer gas such as hydrogen are mixed at least by 0.1 percent or more. The construction stabilizes the pulse discharging more than the alternative case wherein a greater amount of vapor of molecules consisting of a plurality of elements such as water is mixed in the gas, acts to increase the discharge voltage applied across the resistance of the laser medium and decrease the concentration of particles at a lower excitation level and acts to further increase the laser output. FIG. 3 shows characteristics when only hydrogen is mixed in pure neon gas and when hydrogen and water vapor are mixed in pure neon gas. The characteristic curve f shows a characteristic when hydrogen is mixed by several percent in pure neon gas, and the characteristic curve g shows a characteristic when water vapor is further mixed in pure neon gas in which hydrogen is mixed. When water vapor is mixed into pure neon gas and then hydrogen is mixed further, the mixture acts to further stabilize the pulse discharging than an alternative mixture wherein a greater amount of water vapor is mixed. Further, since hydrogen atoms are lighter than neon of the buffer gas, the diffusion of heat, in short, the conveyance amount of heat to the wall of the apparatus is greater, and the temperature of the gas is dropped more rapidly. Consequently, the laser output is increased compared with the mixture of neon in which no hydrogen is mixed but water is mixed. In an embodiment, when hydrogen was mixed at the electric input of 14.4 kW, the laser output increased by 20 percent or so. It is to be noted that, while the laser output is described above when the electric input is within the range of 10 kW to 14.4 kW, also when the electric input is further increased, the laser output rate is further increased if water vapor is mixed into gas and then hydrogen is further mixed. If water vapor is added to the pure neon gas and the rate of addition of water vapor is increased, then a discharge spark becomes thinner in the form of a thread and moves around. Consequently, the discharge becomes unstable. However, when hydrogen gas is added to the pure neon gas together with water vapor, if the rate of the addition water vapor increases, a discharge spark does not comparatively become thinner in the form of a thread. Consequently, the discharge is fixed and is stabilized.

With the pulse laser apparatus according to the third aspect of the present invention, since it is constructed such that, in the first and second aspects, a substance in which molecules consisting of a plurality of elements or gas of light atoms is impregnated is disposed in the tube as means for mixing the molecules consisting of a plurality of elements or the gas of light atoms into the buffer gas, the thus impregnated molecules consisting of a plurality of elements or gas of light atoms can be discharged readily into the tube by the internal temperature of the tube, thereby to act to mix the molecules consisting of a plurality of elements or the gas of light atoms into the buffer gas.

With the pulse laser apparatus according to the fourth aspect of the present invention, since molecules consisting of a plurality of elements such as water by 0.1 percent or more in a high pressure gas bomb of rare gas such as neon is normally liquefied under the gas of a high pressure, water vapor by 0.1 percent or more cannot be mixed. Further, there is another problem that, if a low pressure bomb is employed, then replacement of a bomb must be performed frequently. Therefore, a vessel in which liquid in the form of molecules consisting of a plurality of elements is contained is disposed on a route for supplying the gas into the tube so that the gas may be supplied into the tube by way of the vessel. Consequently, the gas supplied into the tube acts to mix vapor of molecules consisting of a plurality of elements such as water by 0.1 percent or more readily into the gas.

With the pulse laser apparatus according to the fifth aspect of the present invention, since the liquid consisting of a plurality of elements in the vessel is automatically supplemented in the fourth aspect, laser oscillation can be continued without stopping the apparatus.

With the pulse laser apparatus according to the sixth aspect of the present invention, since means for controlling the amount of molecules consisting of a plurality of elements such as water or the amount of gas of light mass number elements (light atoms) in the gas is provided on a route for supplying the gas into the tube, the laser output can be adjusted and stabilized readily.

With the pulse laser apparatus according to the seventh aspect of the present invention, since, in the sixth aspect, a detector for detecting the amount of impurity gas other than the gas enclosed in the tube is provided in the tube or at an exit for the gas in the tube, and the detected amount of impurity gas in the gas is fed back to means for controlling the amount of vapor of molecules consisting of a plurality of elements such as water or the amount of gas of light atoms in the gas enclosed in the tube in accordance with an increase or decrease of the detected amount of impurity gas in the gas, the laser output can be adjusted in accordance with the amount of molecules consisting of a plurality of elements or the amount of gas of light molecules contained in the gas, and a drop of the laser output caused by impurity gas produced in the tube can be prevented readily.

With the pulse laser apparatus according to the eighth aspect of the present invention, since, in the sixth aspect, a laser output, a discharge current, a discharge voltage or an internal temperature of the tube is detected and is fed back to means for controlling the amount of vapor of molecules consisting of a plurality of elements or the amount of gas of light atoms in the gas enclosed in the tube in accordance with a value of difference between the detected signal value and a preset aimed value, the laser output can be stabilized for a longer period of time.

With the pulse laser apparatus according to the ninth aspect of the present invention, the means for cooling the inside of the tube serves also as means for supplying molecules consisting of a plurality of elements into the tube.

With the pulse laser apparatus according to the tenth aspect of the present invention, since it comprises a pipe provided in a tube and having a hole formed in a side face thereof and means for supplying gas in the form of a mixture of buffer gas with molecules consisting of a plurality of elements or gas of light atoms into the tube through the hole of the pipe, gas which has been mixed further uniformly in the axial direction of the tube can be supplied into the tube. Further, the amount of supply of the mixture gas in the axial direction can be adjusted by the diameter or the like of the hole, and uniformity of the axial distribution of the resistance of the laser medium, increase of the laser output and enhancement of the quality of a laser beam can be achieved.

With the pulse laser apparatus according to the eleventh aspect of the present invention, since it comprises means for supplying gas in the form of a mixture of buffer gas with molecules consisting of a plurality of elements or gas of light atoms into the tube by way of one or a plurality of inlet ports formed at a central portion of the tube in its axial direction, the temperature of the gas particularly at a central portion of the laser apparatus in which the tube is long is dropped to increase the laser output.

With the pulse laser apparatus according to the twelfth aspect of the present invention, since, in the tenth aspect, it further comprises a pipe provided at a central portion in the tube in its radial direction and having a hole formed in a side face thereof and means for supplying gas in the form of a mixture of buffer gas with molecules consisting of a plurality of elements or gas of light atoms into the tube through the hole of the pipe, the temperature of the gas particularly in the proximity of the center of the tube is dropped to increase the laser output.

With the pulse laser apparatus according to the thirteenth aspect of the present invention, since it comprises means for detecting an intensity of light emitted by discharging and means for controlling the amount of vapor of molecules consisting of a plurality of elements or the amount of gas of light atoms in the gas enclosed in the tube in accordance with an intensity of light having a wavelength in the proximity of an oscillation frequency of the laser apparatus, the laser output is further stabilized.

With the pulse laser apparatus according to the fourteenth aspect of the present invention, since it comprises means for detecting a laser output only of the laser wavelength of 510 nm and means for controlling the amount of vapor of molecules consisting of a plurality of elements in the gas enclosed in the tube in accordance with an increase or decrease of the detected signal value, the laser output only of the selected laser wavelength is increased and stabilized.

With the pulse laser apparatus according to the fifteenth aspect of the present invention, since it comprises means for detecting intensities of a laser output at least at two different points in a radial direction and means for controlling the amount of vapor of molecules consisting of a plurality of elements or the amount of gas of light atoms in the gas enclosed in the tube in accordance with an increase or decrease of a gradient of the detected laser output intensities in the radial direction, the laser output distribution in the radial direction is made further uniform.

With the pulse laser apparatus according to the sixteenth aspect of the present invention, since it comprises means for stopping mixture of vapor of molecules consisting of a plurality of elements upon stopping of the apparatus or upon stopping of laser oscillation and/or means for stopping supply of the gas into the discharge tube upon stopping of laser oscillation, admission of excessive vapor of water into the discharge tube can be prevented, and when laser oscillation is to be performed again, the laser output is returned to a stabilized laser output level further rapidly.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIGS. 2A-2F are diagrams illustrating operation of a conventional pulse laser apparatus and a pulse laser apparatus according to the present invention;

FIGS. 30A and 30B are diagrammatic views showing a major portion of a pulse laser apparatus according to a twenty-eighth embodiment of the sixteenth aspect of the present invention.

DETAILED DESCRIPTION OF THE PREFERRED EMBODIMENTS

In the following, preferred embodiments of the present invention will be described in detail with reference to the drawings.

Embodiment 1

Figure 1:
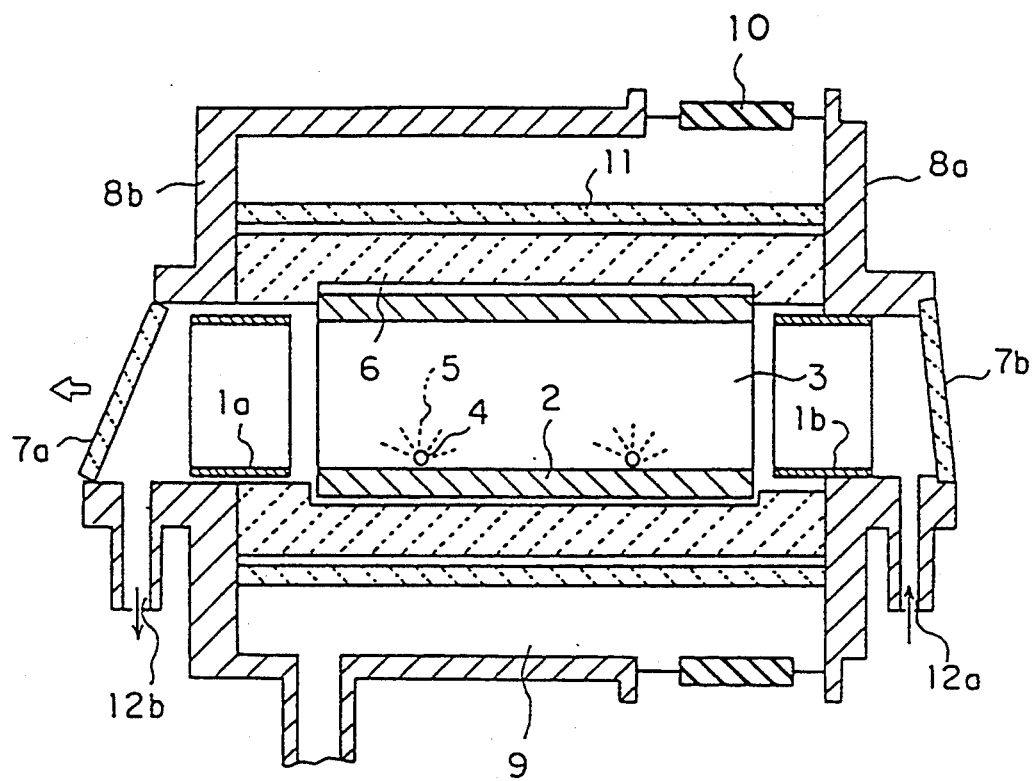
FIG. 1 is a sectional view showing a copper vapor laser apparatus as a conventional pulse laser apparatus.
Figure 3:
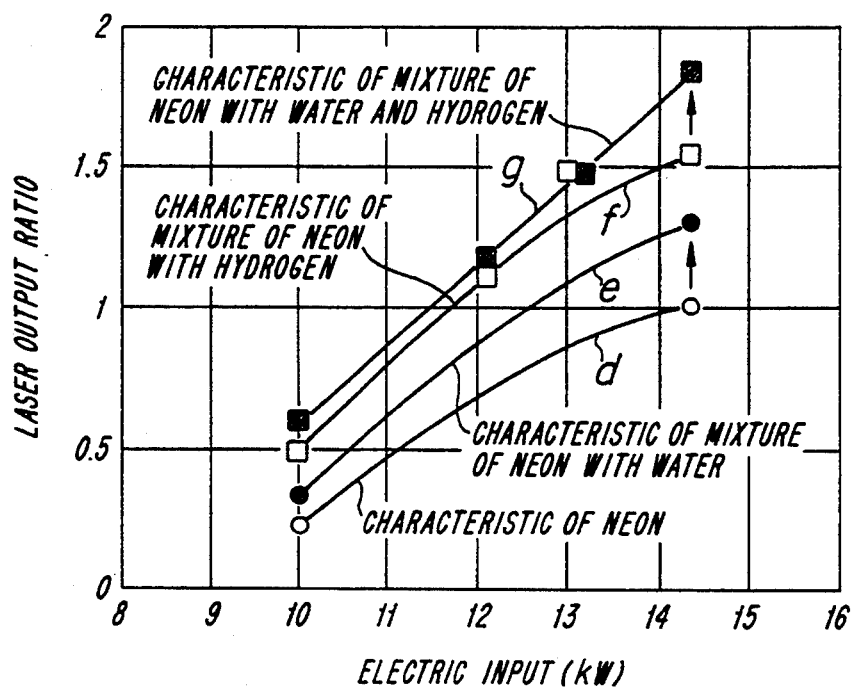
FIG. 3 is a diagram showing the characteristic of the ratio of the laser output to the electric input of excitation pulses of a pulse laser apparatus according to a first embodiment illustrating the effects of the first and second aspects of the present invention.
Figure 4:
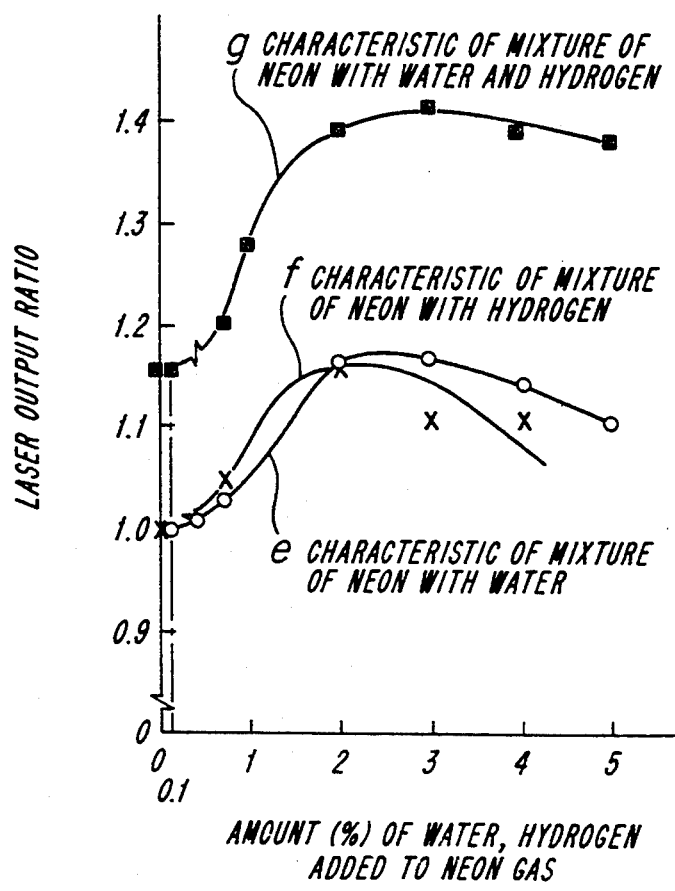
FIG. 4 is a diagram showing a characteristic of the ratio of the laser output to the amounts of water and hydrogen added to buffer gas of a pulse laser apparatus according to a second embodiment illustrating the effects of the first and second aspects of the present invention.

In the following, an embodiment according to the first and second aspects of the present invention will be described. FIG. 3 shows the ratio of the laser output to the electric input to be introduced into a discharge tube by pulse discharge, which has been obtained from an experiment. Referring to FIG. 3, the laser output ratio is indicated by 1 with respect to the laser output when neon gas is employed and the electric input is 14.4 kW. The characteristic curve d indicates the characteristic of the laser output ratio when the buffer gas is neon; the characteristic curve e indicates the characteristic when the buffer gas is neon in which water is mixed by several percent; the characteristic curve f indicates the characteristic when the buffer gas is neon in which hydrogen gas is mixed by several percent; and the characteristic curve g indicates the characteristic when the buffer gas is neon in which hydrogen is mixed by several percent with some water added. FIG. 4 shows laser output ratio characteristics when the amount of water or hydrogen to be added to neon gas is varied. The characteristic curve e indicates the characteristic when water is mixed according to the first aspect of the present invention. When water is added, the laser output ratio is little different from that of the buffer gas of neon where the amount of water added is equal to or less than 0.1 percent, but if the amount of water added is increased to 3 percent, the laser output is increased by 20 percent or so. The characteristic curve g indicates the characteristic when hydrogen is mixed by 2 percent in neon with some water added according to an embodiment of the second aspect of the present invention. When the amount of water added is equal to or less than 0.1 percent, the laser output ratio exhibits the increase of 15 percent, but when the amount of water added is increased to 3 percent, the laser output is increased by 40 percent or so. Subsequently, a phenomenon when water is mixed in buffer gas will be described. Referring to FIG. 2, the characteristic curves indicated by broken lines indicate the characteristics when water vapor is mixed in the buffer gas. It has become clear that, when water vapor is mixed, the gas temperature (curve D) for a pulse off period (between points b and c) in the pulse waveform train shown in the curve A in FIG. 2 drops generally and the concentration (curve E) of particles at a lower excitation level decreases while the discharge resistance (curve F) restores to increase rapidly with respect to time. It has become clear that the discharge resistance for the pulse on period (between the points a and b) and the voltage applied across the discharge resistance depend upon the decrease of the concentration of particles at the lower excitation level and the degree of the discharge resistance for the pulse off period. Further, it has become clear that, if water vapor OF hydrogen is added to the buffer gas, then the discharge resistance for a pulse on period is increased and the laser output is increased. Furthermore, the laser output is increased by a greater amount when both of water vapor and hydrogen are mixed by suitable amounts (in an embodiment, water vapor by 1 percent and hydrogen by 2 percent) in the buffer gas than when only vapor steam is mixed and when only hydrogen is mixed. This is because, when water vapor is mixed, the water is dissociated into hydrogen gas and oxygen gas by heat of the high temperature buffer gas for a pulse off period so that the gas temperature is dropped effectively and besides the heat is conveyed to the wall side by the thus dissociated hydrogen or oxygen atoms. Further, when hydrogen is mixed separately from water vapor, since it is lighter than atoms of the buffer gas, the conveyance of heat to the wall is performed further effectively by the speed of diffusion of the hydrogen gas so that the gas temperature is dropped rapidly. On the other hand, if the mixture rate of water vapor is increased excessively, then the discharge becomes unstable, and although the gas temperature drops, the laser output does not increase. Consequently, according to the second aspect of the present invention, it has become clear that, as a method of dropping the gas temperature without making the discharge unstable, if water vapor is added by an optimum amount to the buffer gas and hydrogen is further added, the laser output can be increased. Further, if only neon gas is used as the buffer gas, water contained in the insulator member 6 and so forth in the apparatus is evaporated so that, when the apparatus starts its operation, the neon gas is in a condition wherein it contains water vapor by 1 percent or so, but after the apparatus is operated for a long period of time, the water vapor almost disappears and discharging takes place only by way of neon. When operation of the apparatus continues for a long period of time after starting of the operation thereof, the mixture rate of water vapor in neon gas varies from 1 percent to 0 percent or so, whereupon the laser output ratio varies from 1.3 to 1.15 as seen from FIG. 4, and accordingly, the laser output is unstable. In contrast, when a mixture of neon gas, hydrogen and water vapor by 2 percent or so is used as the buffer gas, if the mixture ratio of water vapor varies between 2 percent to 3 percent or so due to the addition of water vapor from, for example, the insulator member 6 and so forth, the laser output ratio exhibits the variation only from 1.4 percent to 1.42 percent as seen from FIG. 4. Accordingly, the laser output which is very stable can be obtained. Further, while a mixture of water and hydrogen in neon gas is employed according to the first and second aspects of the present invention, molecules such as heavy water, alcohol or carbon dioxide gas constituted from a plurality of elements which are dissociated into different gases and absorb heat upon such dissociation may be mixed in place of water. Further, similar effects are exhibited even when a light atom gas such as helium or deuterium which is lighter than neon which is employed as the buffer gas is employed.

Embodiment 2

Figure 5:
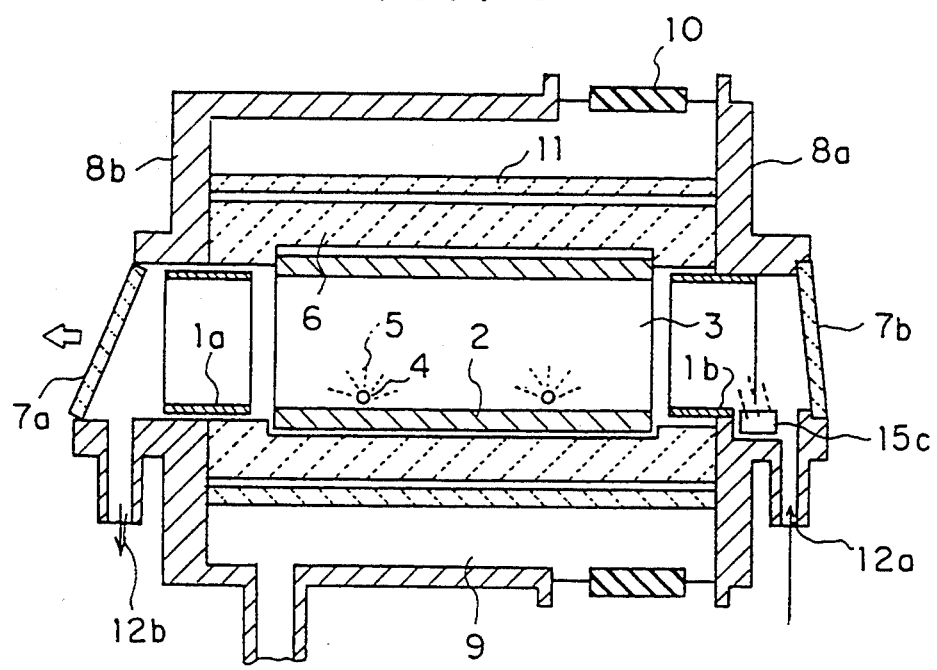
FIG. 5 is a schematic sectional view showing a major portion of a pulse laser apparatus according to a third embodiment of the third aspect of the present invention.

An embodiment of the third aspect of the present invention will be described. Referring now to FIG. 5, reference character 15c denotes a gas absorbing member. Hydrogen gas or water is absorbed in the gas absorbing member 15c. The gas absorbing member 15c is placed in the proximity of a gas inlet port and discharges the water or hydrogen gas absorbed therein depending upon the temperature from the discharge tube 2. The thus discharged gas is mixed with buffer gas from the gas inlet port and supplied into the discharge tube 2. When water or hydrogen is mixed with neon by means of the gas absorbing member in this manner, they can be mixed readily and besides can be mixed in a compact and inexpensive system. The material of the gas absorbing member 15c may be ceramic, titanium, heat-resisting wool or the like.

Embodiment 3

Figure 6:
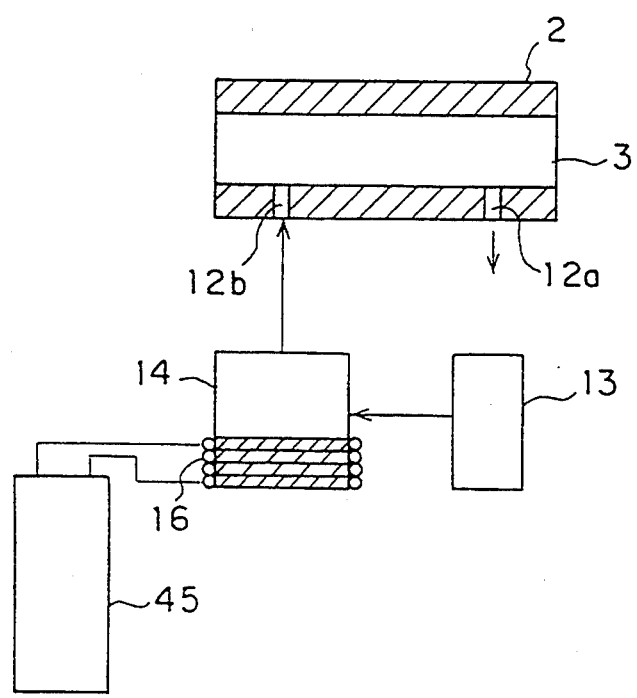
FIG. 6 is a diagrammatic schematic view showing a major portion of a pulse laser apparatus according to a fourth embodiment of the fourth aspect of the present invention.
Figure 7:
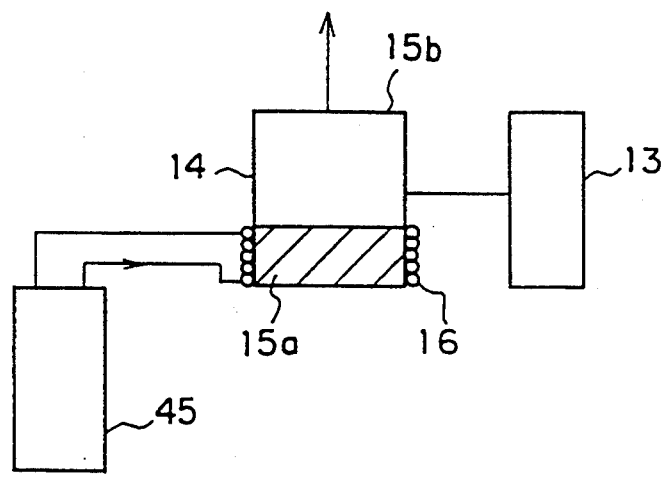
FIG. 7 is a diagrammatic view showing a major portion of a pulse laser apparatus for mixing water into gas according to another embodiment of the fourth aspect of the present invention.

An embodiment of the fourth aspect of the present invention will be described subsequently. FIGS. 6 and 7 are diagrammatic views showing an outline of a copper vapor laser and an apparatus for mixing vapor of molecules of a plurality of elements such as water, respectively. Referring to FIGS. 6 and 7, reference character 13 denotes a gas supplying apparatus for supplying a mixture gas of neon and hydrogen or supplying neon gas, 14 a vessel in which the gas and molecular liquid consisting of a plurality of elements are accommodated, 15a liquid such as water for generating therefrom vapor of molecules consisting of a plurality of elements to be enclosed in the vessel 14, and 15b vapor of molecules consisting of a plurality of elements in the vessel 14. A gas mixing apparatus such as a fan may be provided in the vessel 14, and a plurality of such vessels 14 may be provided. Further, reference numeral 16 denotes a heater for controlling the temperature of the liquid 15a in the vessel 14, and 45 a current regulator for regulating the temperature of the heater 16. A bomb in the gas supplying apparatus 13 normally contains therein buffer gas such as neon having the purity equal to or higher than 99.1 percent and having a high pressure equal to or higher than 10 normal atmospheres, and in the high pressure bomb, vapor of molecules consisting of a plurality of elements and containing water by 0.1 percent or more will be solidified and cannot be mixed. Subsequently, operation of the embodiment shown in FIGS. 6 and 7 will be described. As means for mixing vapor of molecules consisting of a plurality of elements into gas, gas from the gas supplying apparatus 13 is supplied into a route for the supply of gas to the discharge tube 2 by way of the inside of a water tank of the vessel 14 for the generation of vapor of molecules consisting of a plurality of elements such as water so that the gas of a low pressure from the gas supplying apparatus 13 and the liquid 15a are placed in contact with each other so as to mix an amount of water vapor, which depends upon the pressure of the vapor of the liquid 15a, with the gas. Further, by varying the current flowing through the heater 16 by means of the current regulator 45, the temperatures of the gas 15b of the low pressure and the liquid 15a are adjusted to control the amount of vapor of molecules consisting of a plurality of elements such as water which can be mixed into the gas. The gas containing the vapor of the molecules consisting of a plurality of elements in this manner is supplied into the discharge spacing 3. As described so far, while vapor of molecules consisting of a plurality of elements cannot be mixed by an amount greater than a predetermined level (0.1 percent) in the high pressure bomb, since the vapor has a lower pressure in the route by way of which it is to be supplied from the high pressure bomb to the discharge tube 2, the vapor of molecules consisting of a plurality of elements by several percent from the liquid 15a can be mixed readily with the gas in the route.

Embodiment 4

Figure 8:
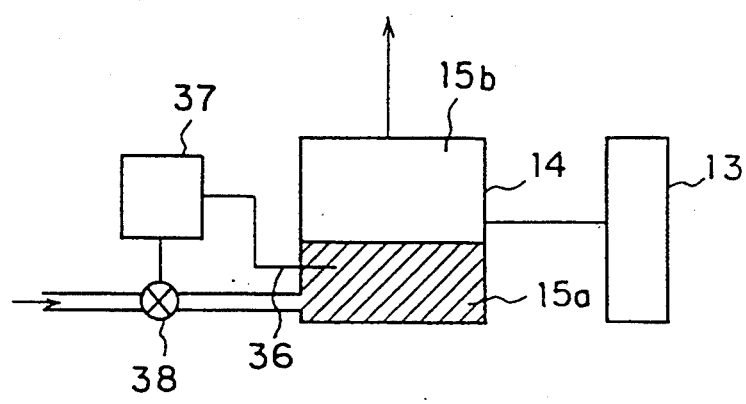
FIG. 8 is a diagrammatic view showing a major portion of a pulse laser apparatus for mixing water into gas according to a sixth embodiment of the fifth aspect of the present invention.

An embodiment of the fifth aspect of the present invention will be described subsequently. FIG. 8 shows an apparatus for mixing vapor of molecules consisting of a plurality of elements such as water. Reference numeral 36 denotes a level detector for detecting the amount of molecular liquid consisting of a plurality of elements such as water, 38 a solenoid valve for supplementing molecular liquid consisting of a plurality of elements such as water, and 37 a control circuit for controlling the solenoid valve 38. Subsequently, operation of the embodiment shown in FIG. 8 will be described. When liquid 15a in a vessel 14 drops to a predetermined level, the detector 36 operates and delivers a signal to the control circuit 37. Consequently, the control circuit 37 delivers an instruction to the solenoid valve 38 to supplement the liquid 15a.

Embodiment 5

Figure 9:
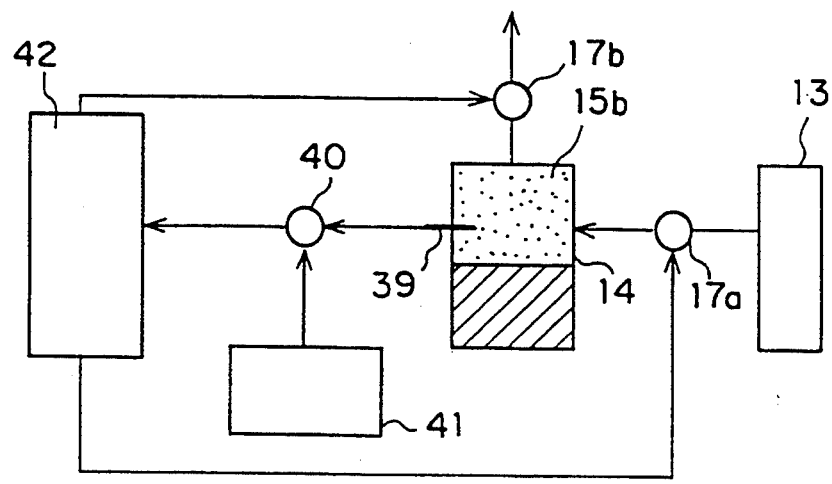
FIG. 9 is a diagrammatic view showing a major portion of a pulse laser apparatus for mixing water into gas and controlling the amount of water to be mixed according to a seventh embodiment of the sixth aspect of the present invention.
Figure 10:
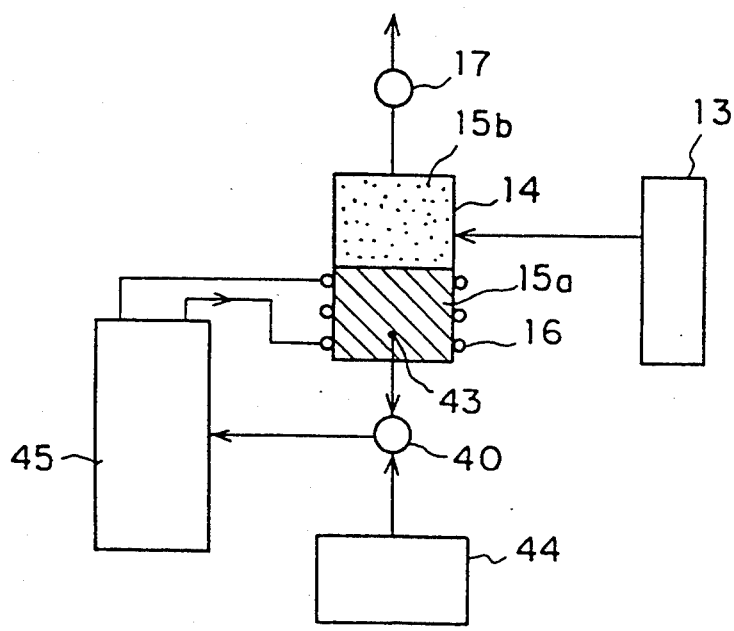
FIG. 10 is a diagrammatic view showing a major portion of a pulse laser apparatus for mixing water into gas and controlling the amount of water to be mixed according to another embodiment of the sixth aspect of the present invention.

An embodiment of the sixth aspect of the present invention will be described subsequently. FIG. 9 shows an apparatus for mixing molecular vapor consisting of a plurality of elements such as water. Reference characters 17a and 17b denote solenoid valves for regulating the pressure in a vessel 14, reference numeral 39 denotes a pressure sensor, 40 a comparator, 41 an aimed pressure setter, and 42 an electromagnetic flow rate regulator. Subsequently, an operation of the embodiment shown in FIG. 9 will be described. The pressure of gas in the vessel 14 is detected by a pressure sensor 39, and a preset aimed pressure signal from the pressure setter 41 and the detected pressure are compared with each other by means of the comparator 40. The comparator 40 delivers a difference signal representing the difference between them to the electromagnetic flow rate regulator 42. The electromagnetic flow rate regulator 42 regulates the solenoid valves 17a and 17b so that an aimed pressure may be obtained. In this manner, an aimed pressure is set by way of the pressure setter 41, and the pressure of gas in the vessel 14 is controlled to control the ratio of vapor of molecules consisting of a plurality of elements such as water included in the gas within the vessel 14 by way of the pressure of the gas supplied from the gas supplying apparatus 13 and a partial pressure of the pressure of vapor of the liquid 15a. FIG. 10 shows another embodiment of the sixth aspect of the present invention. Referring to FIG. 10, reference numeral 43 denotes a temperature sensor, 40 a comparator, 44 an aimed temperature setter, and 45 a current regulator for controlling the current to flow through a heater 16. Subsequently, operation of the embodiment shown in FIG. 10 will be described. The liquid 15a in a vessel 14 is detected by means of the temperature sensor 43, and a preset aimed temperature from the aimed temperature setter 44 and the thus detected temperature of the liquid 15a are compared with each other by means of the comparator 40 and a difference signal representing the difference between them is transmitted from the comparator 40 to the current regulator 45. The current regulator 45 regulates the current to flow through a heater so that the aimed temperature may be obtained. In this manner, an aimed temperature is set by means of the temperature setter 44, and the temperature of the liquid 15a in the vessel 14 is controlled to vary the pressure of vapor of the liquid 15a in order to control the ratio of vapor of molecules consisting of a plurality of elements such as water included in the gas in the vessel 14. It is to be noted that a pipe line for gas from the vessel 14 to the discharge tube is retained in heat so that the vapor of molecules consisting of a plurality of elements such as water included in the gas may not be solidified again.

Embodiment 6

Figure 11:
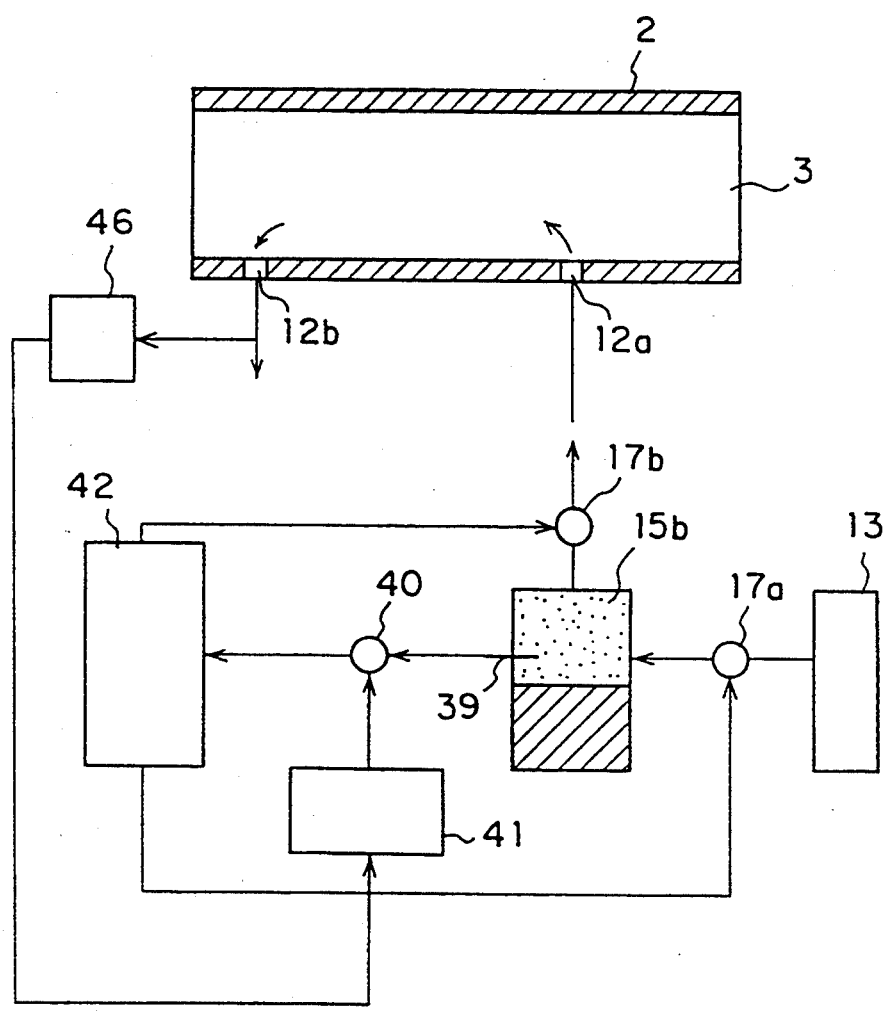
FIG. 11 is a diagrammatic view showing a major portion of a pulse laser apparatus for controlling the amount of water to be mixed into gas by means of impurity gas according to a ninth embodiment of the seventh aspect of the present invention.

An embodiment of the seventh aspect of the present invention will be described subsequently. FIG. 11 shows an apparatus of the seventh aspect of the present invention. Reference numeral 46 denotes an impurity gas detector for detecting an amount of impurity gas. The impurity gas detector 46 is disposed at an exit 12b for discharging gas from a discharge tube. Subsequently, operation of the embodiment shown in FIG. 11 will be described. The pulse laser apparatus of FIG. 11 is a modification to the pulse laser apparatus of FIG. 9 of the embodiment of the sixth aspect of the present invention in that it additionally includes the impurity gas detector 46 at the exit 12b for discharging gas from the discharge tube and a signal from the impurity gas detector 46 is transmitted to the pressure setter 41 in order to vary the aimed gas pressure. In this manner, gas discharged from the discharge tube 2 is detected by means of the impurity gas detector 46 disposed at the exit 12b for discharging gas from the discharge tube 2 to detect the amount of impurity gas in the discharge tube 2, and the pressure of the gas in the vessel 14 is adjusted in response to an increase or decrease of the amount of impurity gas to control the variation of the amount of vapor of molecules consisting of a plurality of elements such as water included in the gas of the liquid 15a. While a drop of the laser output is caused by an increase of impurity gas in the discharge tube 2, the laser output is stabilized if the amount of water vapor is adjusted in response to an increase of the amount of impurity gas in this manner.

Figure 12:
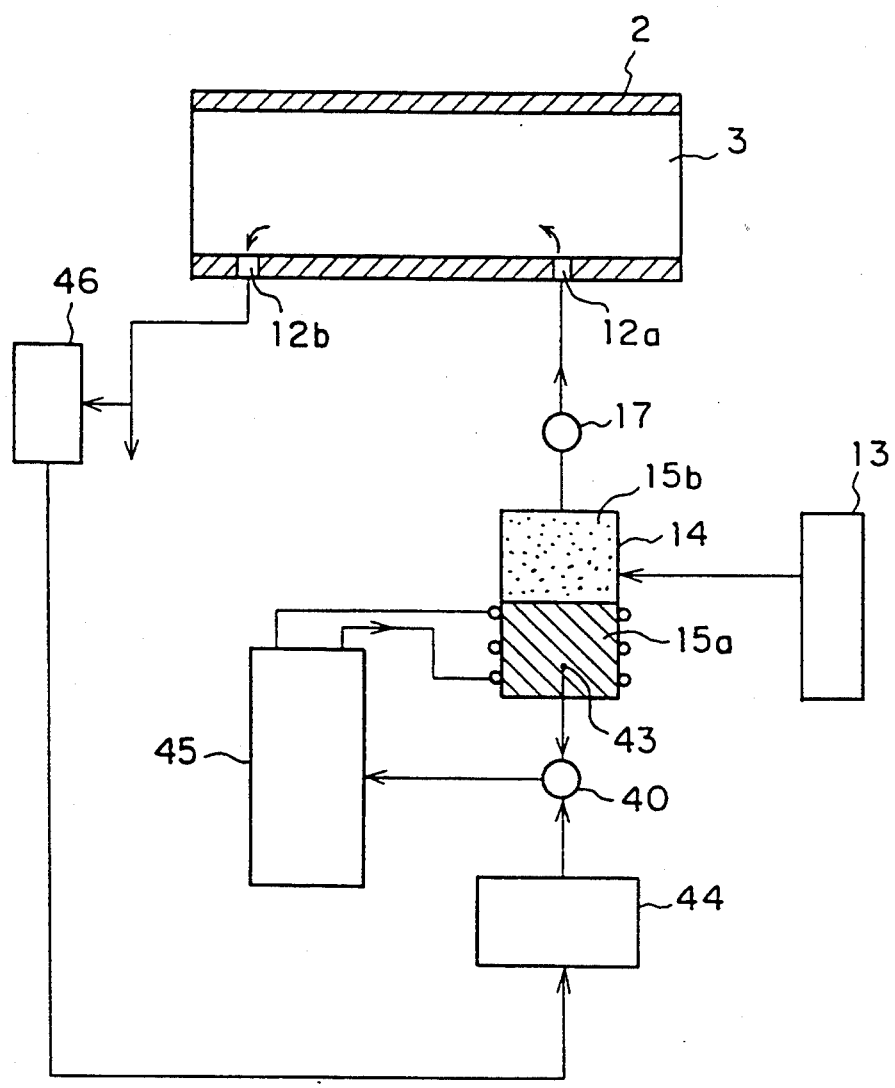
FIG. 12 is a diagrammatic view showing a major portion of a pulse laser apparatus for controlling the amount of water to be mixed into gas by means of impurity gas according to another embodiment of the seventh aspect of the present invention.

FIG. 12 shows another embodiment of the seventh aspect of the present invention. The pulse laser apparatus of FIG. 12 is a modification to the pulse laser apparatus of FIG. 10 of the embodiment of the sixth aspect of the present invention in that it additionally includes an impurity gas detector 46 at the exit 12b for discharging gas from the discharge tube and a signal from the impurity gas detector 46 is transmitted to the temperature setter 44 in order to vary the aimed temperature of the liquid 15a. In this manner, gas discharged from the discharge tube 2 is detected by means of the impurity gas detector 46 disposed at the exit 12b for discharging gas from the discharge tube 2 to detect the amount of impurity gas in the discharge tube 2, and the temperature of the liquid in the vessel 14 is adjusted in response to an increase or decrease of the amount of impurity gas to control the variation of the amount of vapor of molecules consisting of a plurality of elements such as water included in the gas of the liquid 15a. While a drop of the laser output is caused by an increase of impurity gas in the discharge tube 2, the laser output is stabilized if the amount of water vapor is adjusted in response to an increase of the amount of impurity gas in this manner so that the amount of vapor of molecules consisting of a plurality of elements such as water in the gas may be decreased. Further, while, in the embodiment described above, the amount of vapor of molecules consisting of a a plurality of elements such as water in the gas is controlled by an increase of the impurity gas, alternatively the amount of gas of light atoms such as hydrogen mixed in the buffer gas in the gas supplying apparatus may be controlled in response to a decrease of the impurity gas.

Embodiment 7

Figure 13:
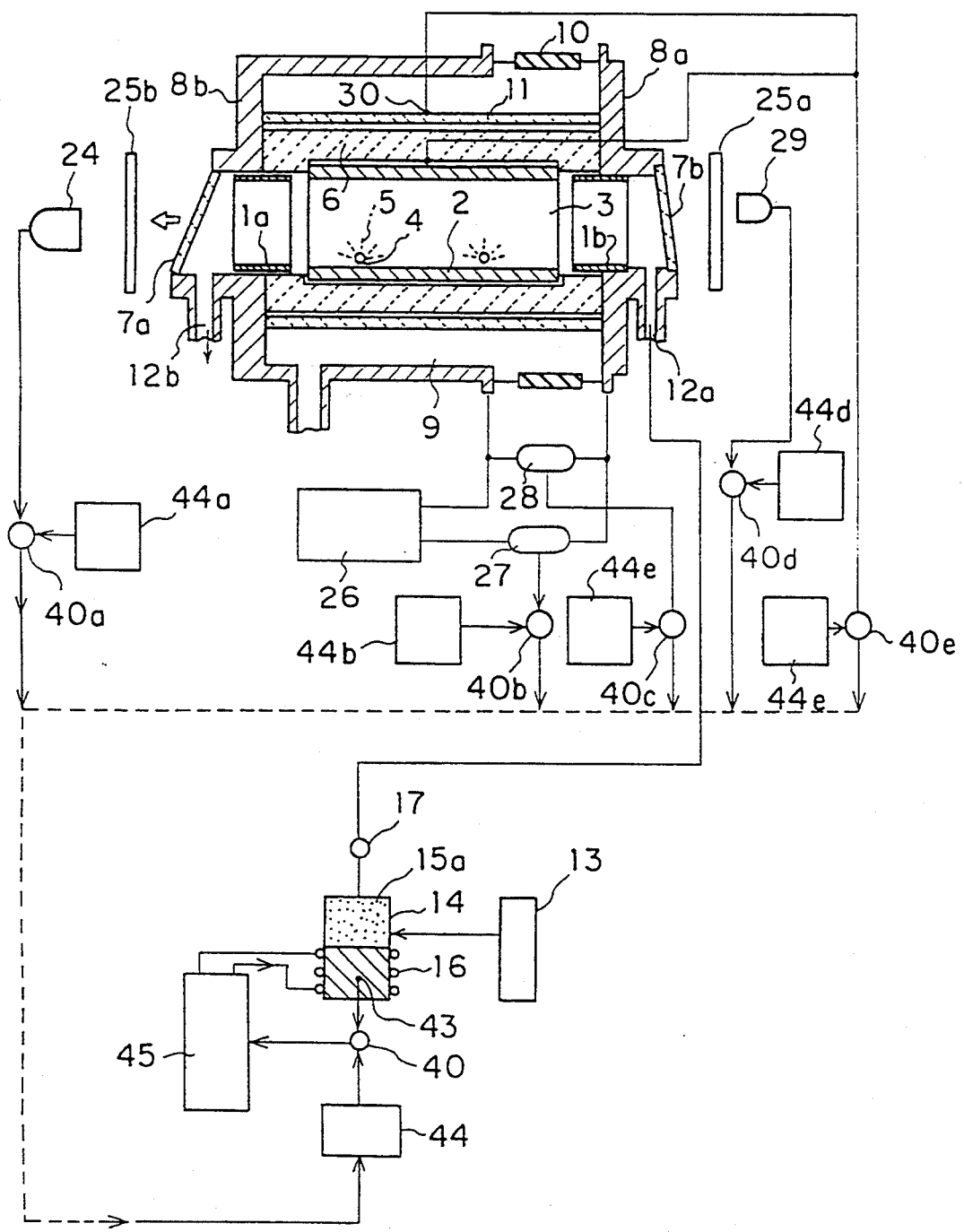
FIG. 13 is a diagrammatic view showing a major portion of a pulse laser apparatus for controlling the amount of water to be mixed into gas by means of the laser output value, the current value, the voltage value or the temperature of a discharge tube according to an eleventh embodiment of the eighth aspect of the present invention.

An embodiment of the eighth aspect of the present invention will be described. FIG. 13 shows the embodiment of the eighth aspect of the present invention. Reference numeral 24 denotes a laser power detector, reference characters 25a and 25b denote resonance mirrors, reference numeral 26 denotes a pulse power source, 27 a current detector, 28 a voltage detector, 29 a radiation thermometer, reference characters 40a, 40h, 40c, 40d and 40e denote comparators, and 44a, 44b, 44c, 44d and 44e aim setters. Subsequently, operation of the embodiment shown in FIG. 13 will be described. The embodiment of FIG. 13 is a modification to the pulse laser apparatus of the embodiment of the sixth aspect of the present invention shown in FIG. 10 in that it additionally includes the laser power detector 24, the current detector 27, the voltage detector 38 and the radiation thermometer 29. The signals from those detectors and the signals from the aim setters 44a to 44e are compared with each other, respectively, and difference signals representing the difference between them are transmitted to the temperature setter 44 to vary the aimed temperature of the liquid 15a. In this manner, an increasing or decreasing condition of the laser output is discriminated from the difference signals from the detected signals and the temperature of the liquid in the vessel 14 is adjusted to control the variation of the amount of vapor of molecules consisting of a plurality of elements such as water contained in gas of the liquid 15a. The decrease of the laser output is caused by two factors. In particular, the first factor is the amount of vapor of molecules consisting of a plurality of elements such as water or the amount of light atom gas contained in the buffer gas. The second factor is deterioration of the laser medium caused by impurity gas or the like produced in the discharge tube. In the case of the decrease of the laser output caused by the first factor, the laser output detected by the laser power detector 24 drops while the peak value of the pulse current or the average current detected by the current detector 27 increases, and the peak value of the pulse voltage or the average voltage detected by the voltage detector 28 drops and the temperature of the discharge tube detected by the temperature detector 30 drops. On the other hand, in the case of the decrease of the laser output caused by the second factor, the laser output detected by the laser power detector 24 drops and the peak value of the pulse current or the average current detected by the current detector 27 drops, but the peak value of the pulse voltage or the average voltage value detected by the voltage detector 28 rises and the temperature of the discharge tube detected by the temperature detector 30 rises. If a drop of the laser output and variations of the pulse current, the voltage and the temperature of the discharge tube are detected in this manner, the drop of the laser output caused by the first factor and the drop of the laser output caused by the second factor can be discriminated. In the case of the drop of the laser output caused by the first factor, if it is determined that the amount of vapor of molecules consisting of a plurality of elements such as water or the amount of light atom gas contained in buffer gas is small and then the aimed temperature of the temperature setter 44 is set to a comparatively high value so as to adjust the amount of vapor of molecules consisting of a plurality of elements such as water contained in the gas in the vessel 14 in its increasing direction, then the drop of the laser output is decreased and the laser output is stabilized. On the other hand, in the case of the drop of the laser output caused by the second factor, if it is determined that the drop of the laser output is caused by deterioration of the laser medium caused by increase of impurity gas and so forth in the discharge tube 2 and the aimed temperature of the temperature setter 44 is set to a comparatively low value so as to adjust the amount of vapor of molecules consisting of a plurality of elements such as water contained in the gas in the vessel 14 in its decreasing direction, then the drop of the laser output is decreased and the laser output is stabilized. It is to be noted that, while, in the embodiment described above, the amount of vapor 0f molecules consisting of a plurality of elements such as water in gas is controlled by a decrease of the laser output, alternatively the amount of light atom gas such as hydrogen mixed in the buffer gas in the gas supplying apparatus may be controlled.

Embodiment 8

An embodiment of the ninth aspect of the present invention will be described. In the embodiments shown in FIGS. 14 and 15, liquid 15a is directly supplied, separately from gas, into a discharge spacing 3 through one or a plurality of inlet ports 19 provided in a discharge tube. In the embodiment shown in FIG. 15, the inlet ports 19 are provided in the proximity of a pair of electrodes 1a and 1b of the discharge tube 2.

Figure 14:
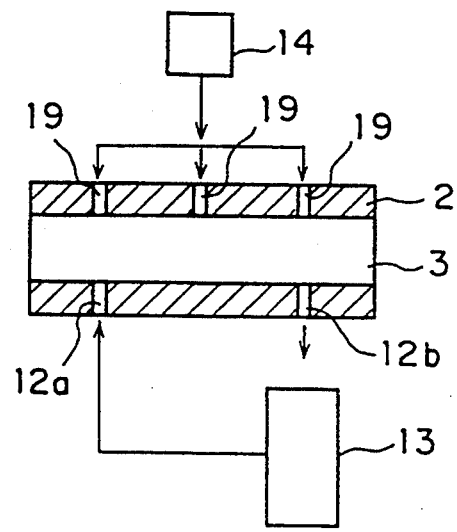
FIG. 14 is a diagrammatic view showing a major portion of a pulse laser apparatus according to a twelfth embodiment of the ninth aspect of the present invention.
Figure 15:
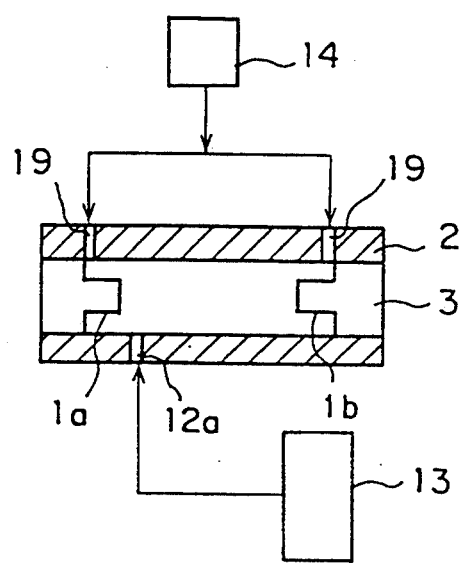
FIG. 15 is a diagrammatic view showing a major portion of a pulse laser apparatus according to a thirteenth embodiment of the ninth aspect of the present invention.

In the embodiment shown in FIG. 14, the liquid 15a is supplied into the discharge spacing 3 by way of the one or the plurality of inlet ports 19 provided in the discharge tube 2. As an example, in a metal vapor laser apparatus such as a copper vapor laser apparatus wherein the temperature of the discharge spacing is higher than the boiling point of water, by supplying water as the liquid 15a, predetermined water vapor can be generated readily in the discharge spacing. Consequently, the vessel for generating water vapor, which is employed in the first embodiment described hereinabove can be eliminated, and accordingly, an increase of the laser output can be achieved with a compact apparatus.

Figure 16:
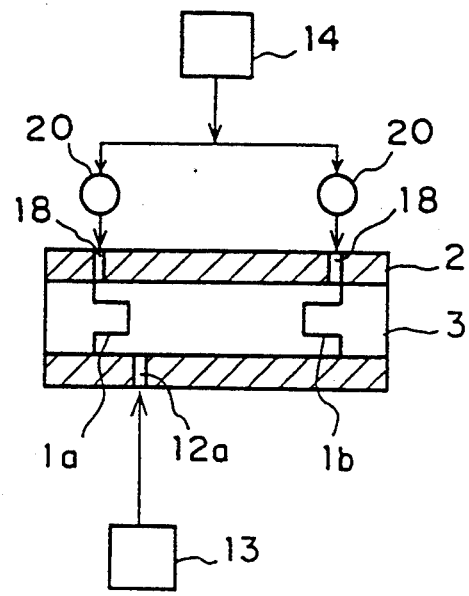
FIG. 16 is a diagrammatic view showing a major portion of a pulse laser apparatus according to a fourteenth embodiment of the ninth aspect of the present invention.
Figure 17:
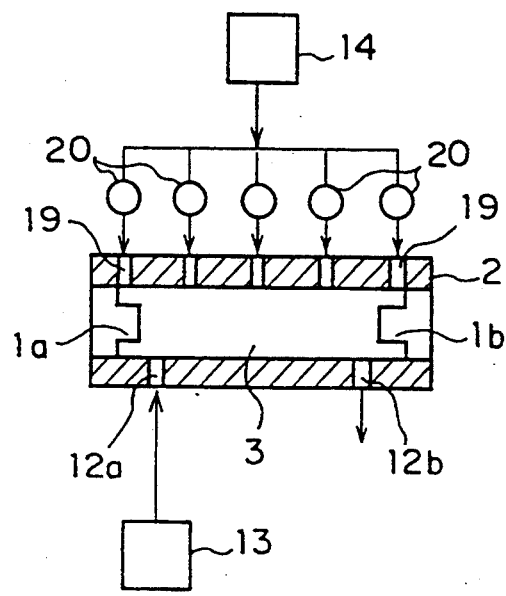
FIG. 17 is a diagrammatic view showing a major portion of a pulse laser apparatus according to a fifteenth embodiment of the ninth aspect of the present invention.

On the other hand, when the inlet ports 19 are provided in the proximity of the electrodes at the opposite ends of the discharge tube, cooling water for cooling the locations in the proximity of the electrodes can be used as the liquid 15a. Consequently, water vapor can be introduced readily into the discharge spacing. FIGS. 16 and 17 show further embodiments of the ninth aspect of the present invention. In the embodiments shown in FIGS. 16 and 17, a flow rate controlling apparatus 20 is provided so as to control the amount of substance 15a to be introduced into the discharge tube. Consequently, according to the embodiments, pulse laser apparatus which are compact and achieve an increase of the laser output and enhancement of the quality and function can be obtained.

Embodiment 9

Figure 18:
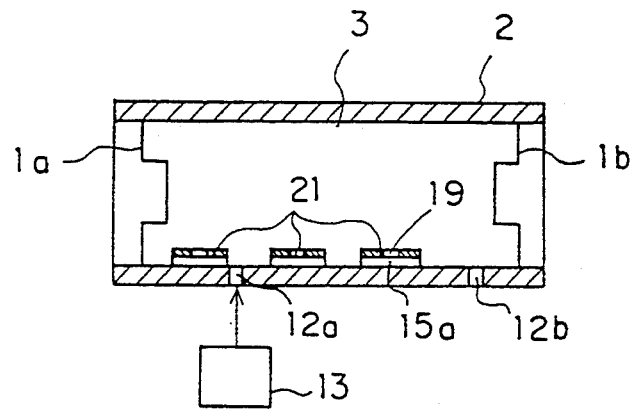
FIG. 18 is a diagrammatic view showing a major portion of a pulse laser apparatus according to a sixteenth embodiment of the tenth aspect of the present invention.
Figure 19:
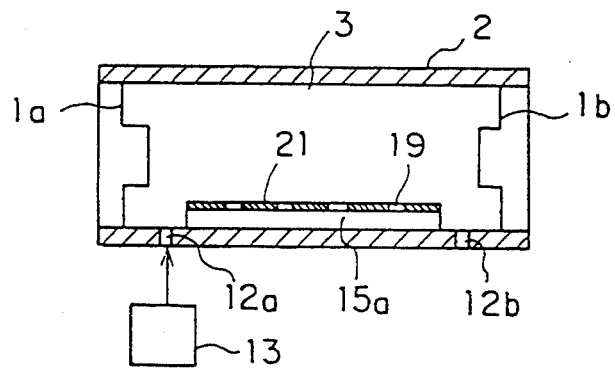
FIG. 19 is a diagrammatic view showing a major portion of a pulse laser apparatus according to a seventeenth embodiment of the tenth aspect of the present invention.
Figure 20:
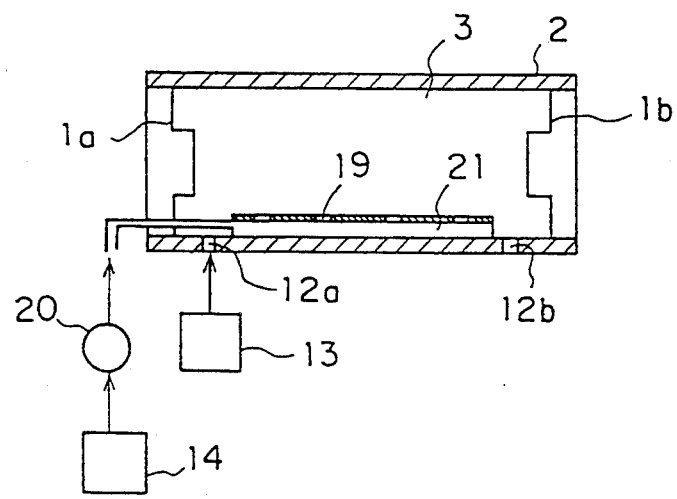
FIG. 20 is a diagrammatic view showing a major portion of a pulse laser apparatus according to an eighteenth embodiment of the tenth aspect of the present invention.
Figure 21:
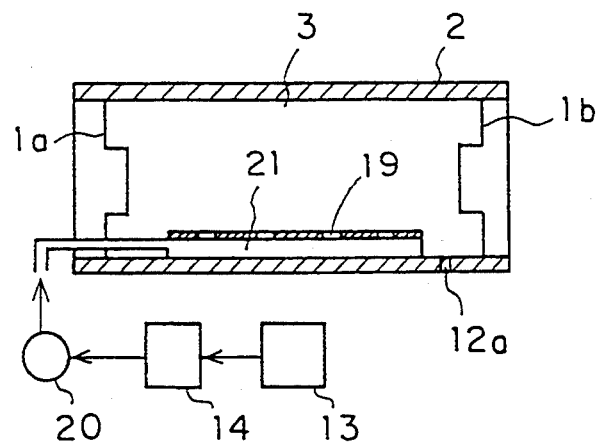
FIG. 21 is a diagrammatic view showing a major portion of a pulse laser apparatus according to a nineteenth embodiment of the tenth aspect of the present invention.

An embodiment of the tenth aspect of the present invention will be described. Referring to FIG. 21, a cylindrical vessel 21 is provided in a discharge tube 2, and a hole 19 for supplying gas into a discharge spacing in the discharge tube 2 therethrough is formed in a side wall of the vessel 21. With this construction, fresh gas containing no impurity gas therein is supplied uniformly in the axial direction of the discharge tube 2 into the vessel 21, and as a result, the laser output is raised. FIGS. 18, 19 and 20 show other embodiments of the tenth aspect of the present invention. In these embodiments, the mixture rate of vapor of molecules consisting of a plurality of elements such as water in gas in the discharge spacing is adjusted to adjust the axial distribution of the resistance of the laser medium in the discharge spacing by way of the position of the inlet port to increase the laser output.

Embodiment 10

Figure 22:
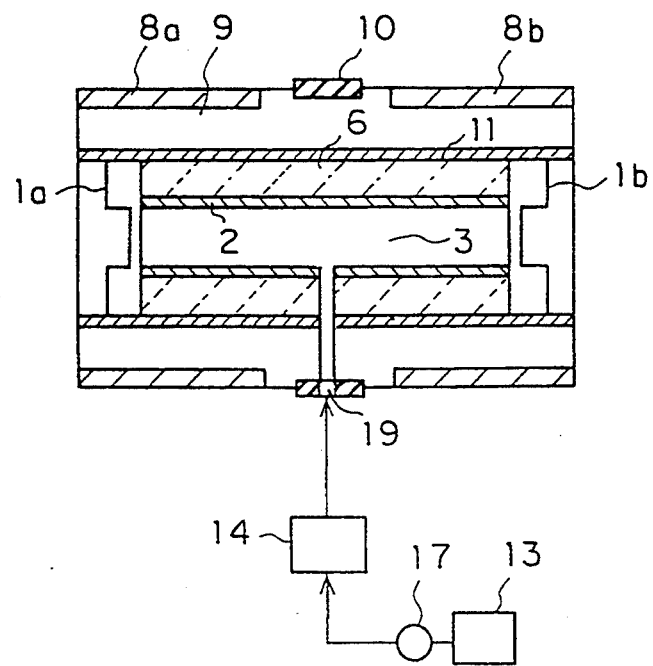
FIG. 22 is a diagrammatic view showing a major portion of a pulse laser apparatus according to a twentieth embodiment of the eleventh aspect of the present invention.
Figure 23:
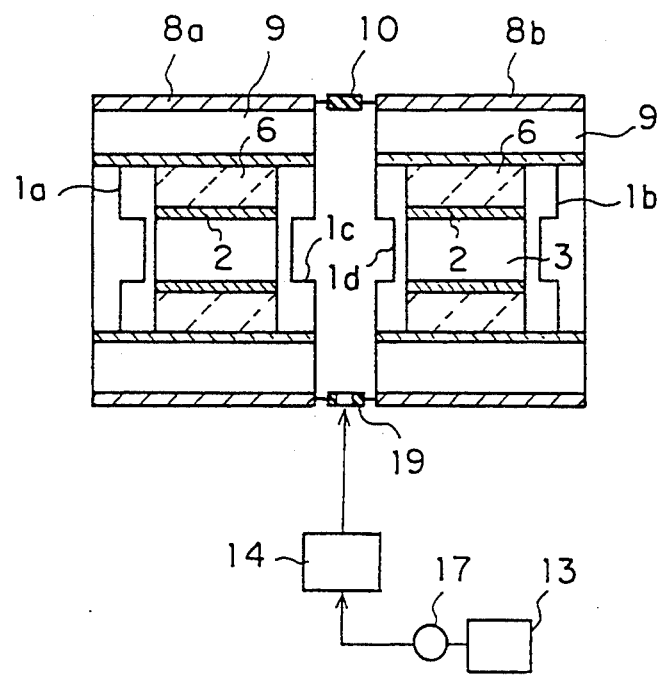
FIG. 23 is a diagrammatic view showing a major portion of a pulse laser apparatus according to a twenty-first embodiment of the eleventh aspect of the present invention.

An embodiment of the eleventh aspect of the present invention will be described. Referring to FIG. 22, a plurality of gas inlet ports 19 are provided around a central portion of a copper vapor laser apparatus which has an insulator tube 10 at a central portion in an axial direction of a discharge tube. Meanwhile, FIG. 23 shows the arrangement wherein a gas inlet port 19 is provided at a central portion of a laser apparatus which has a pair of electrodes 1c and 1d at central portions in an axial direction of a discharge tube.

Embodiment 11

Figure 24:
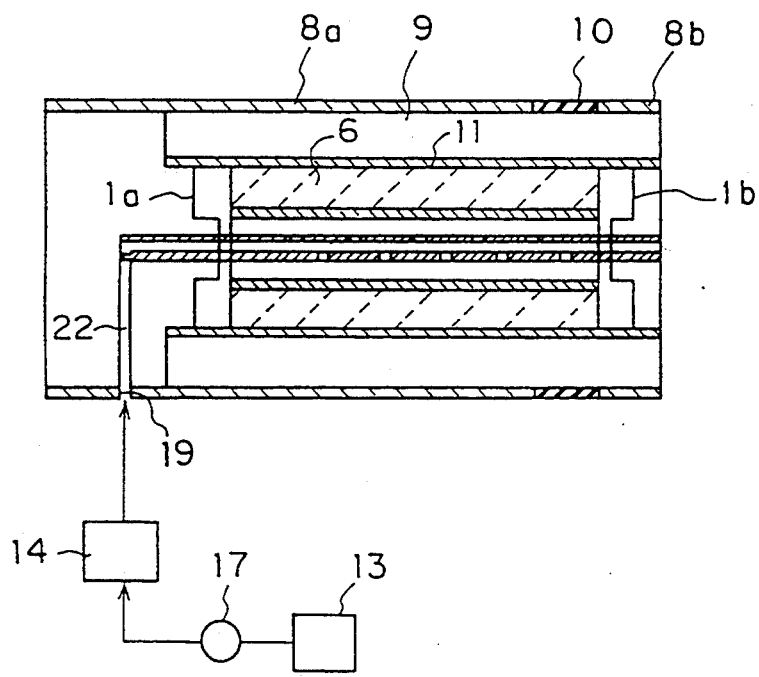
FIG. 24 is a diagrammatic view showing a major portion of a pulse laser apparatus according to a twenty-second embodiment of the twelfth aspect of the present invention.
Figure 25:
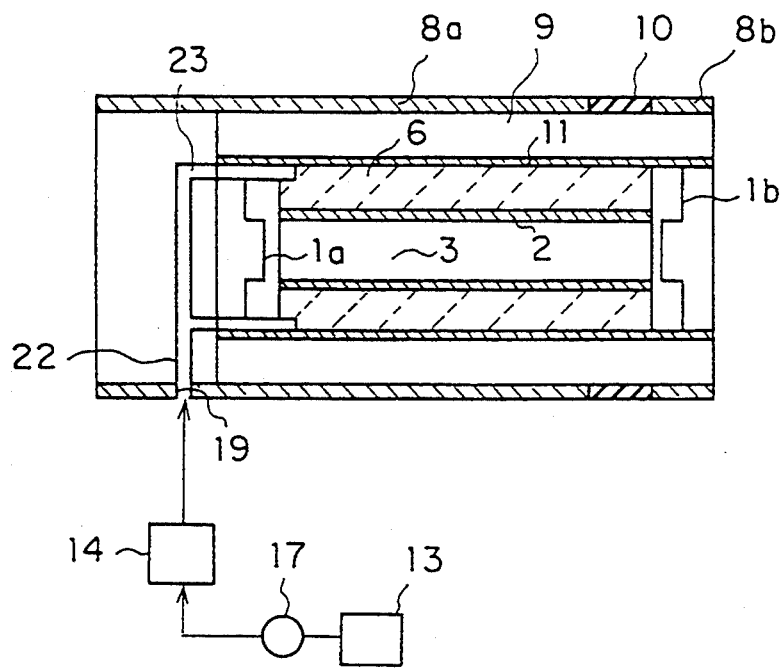
FIG. 25 is a diagrammatic view showing a major portion of a pulse laser apparatus according to a twenty-third embodiment of the twelfth aspect of the present invention.
Figure 26:
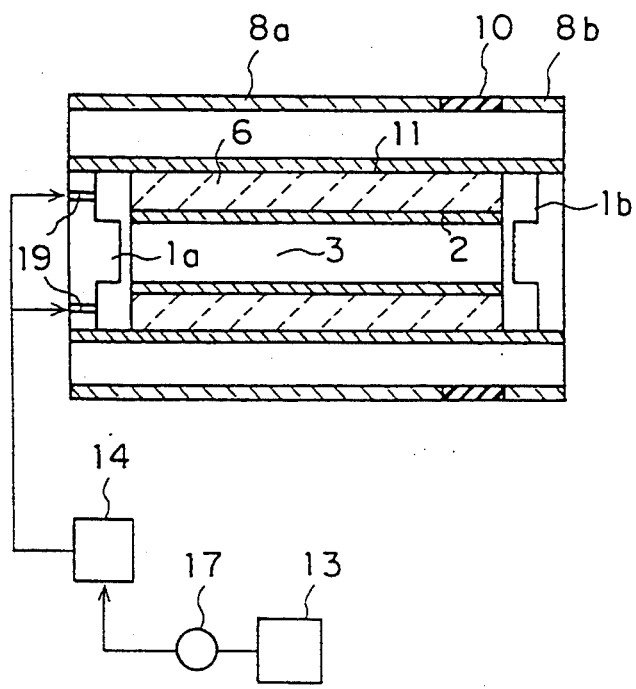
FIG. 26 is a diagrammatic view showing a major portion of a pulse laser apparatus according to a twenty-fourth embodiment of the twelfth aspect of the present invention.

An embodiment of the twelfth aspect of the present invention will be described. Referring to FIG. 24, a vessel 22, for example, in the form of a pipe having a plurality of holes therein is disposed at an axial portion in a radial direction of a discharge tube and gas is introduced into the vessel 22 by way of a gas inlet port 19. Meanwhile. FIGS. 25 and 26 show other embodiments of the twelfth aspect of the present invention. Referring to FIGS. 25 and 26, gas is introduced into a portion of an insulator member 6 of a copper vapor laser apparatus through a gas inlet port by way of a gas introducing pipe 23. Further, in FIG. 25, gas is introduced into the portion of the insulating member 6 past an electrode 1a or 1b in the proximity of the insulator member 6.

In FIG. 24, since the temperature of gas as the medium at an axial portion of a discharge tube in a copper vapor laser apparatus wherein the bore of the discharge tube is large is higher than that in the proximity of a wall of the discharge tube, the number of atoms at the lower excitation level is greater at the axial portion than at an end portion, and also the resistance of the laser medium is low. Consequently, by making the mixture ratio of vapor of molecules consisting of a plurality of elements such as water at the axial portion than at the end portions, the resistance of the laser medium at the axial portion can be increased and the laser output can be increased. Further, a laser output which has a uniform radial distribution can be obtained. Meanwhile, in FIGS. 25 and 26, gas containing vapor of molecules consisting of a plurality of elements such as water is filled in the insulator member. Consequently, since occurrence of discharging at the insulator member is suppressed and discharging is concentrated upon the inside of the discharge tube 2, the laser output can be increased.

Embodiment 12

Figure 27:
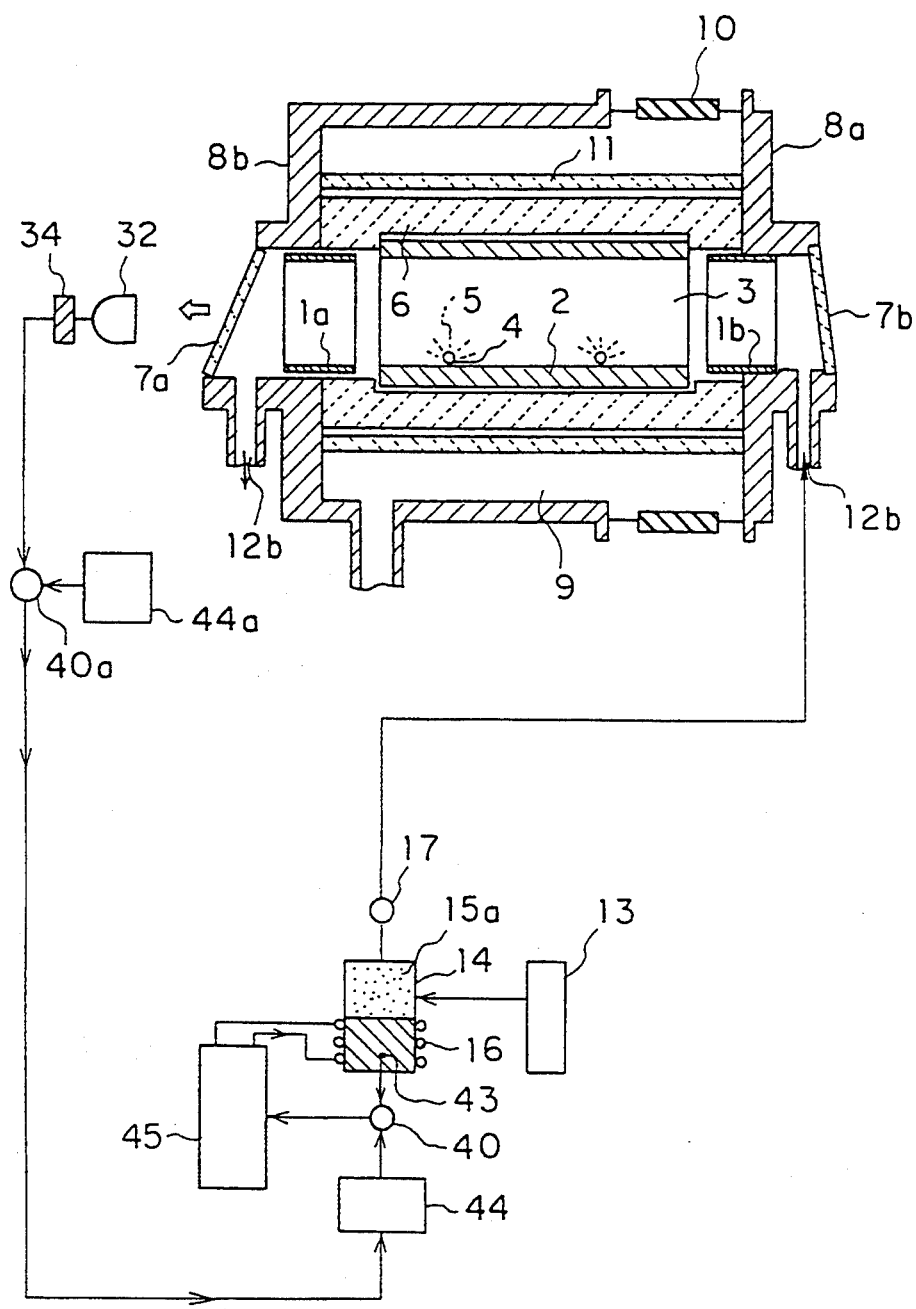
FIG. 27 is a diagrammatic view showing a major portion of a pulse laser apparatus according to a twenty-fifth embodiment of the thirteenth aspect of the present invention.

An embodiment of the thirteenth aspect of the present invention will be described. FIG. 27 shows the embodiment. Reference numeral 32 denotes a light wavelength selecting filter for detecting only light within a predetermined wavelength range of discharge light, and 34 a light detector. Subsequently, the background of the embodiment shown in FIG. 27 will be described. The intensity of that portion of the discharge light which particularly has a wavelength in the proximity of a laser wavelength or another wavelength higher than and in the proximity of the laser wavelength depends much upon the laser output. Consequently, if the intensity of that portion of the discharge light which particularly has a wavelength in the proximity of the laser wavelength or another wavelength higher than but in the proximity of the laser wavelength is used as a sensor and the amount of vapor of molecules consisting of a plurality of elements such as water in the gas is controlled in response to the intensity, then the laser output can be stabilized. In the present control, if the intensity of light decreases, then it is determined that impurity gas or the like has been produced in the discharge tube and the laser medium has been deteriorated, and the amount of vapor of molecules consisting of a plurality of elements such as water or the amount of light atom gas contained in the gas is controlled so that it may be decreased to compensate for the deterioration of the laser medium.

Embodiment 13

Figure 28:
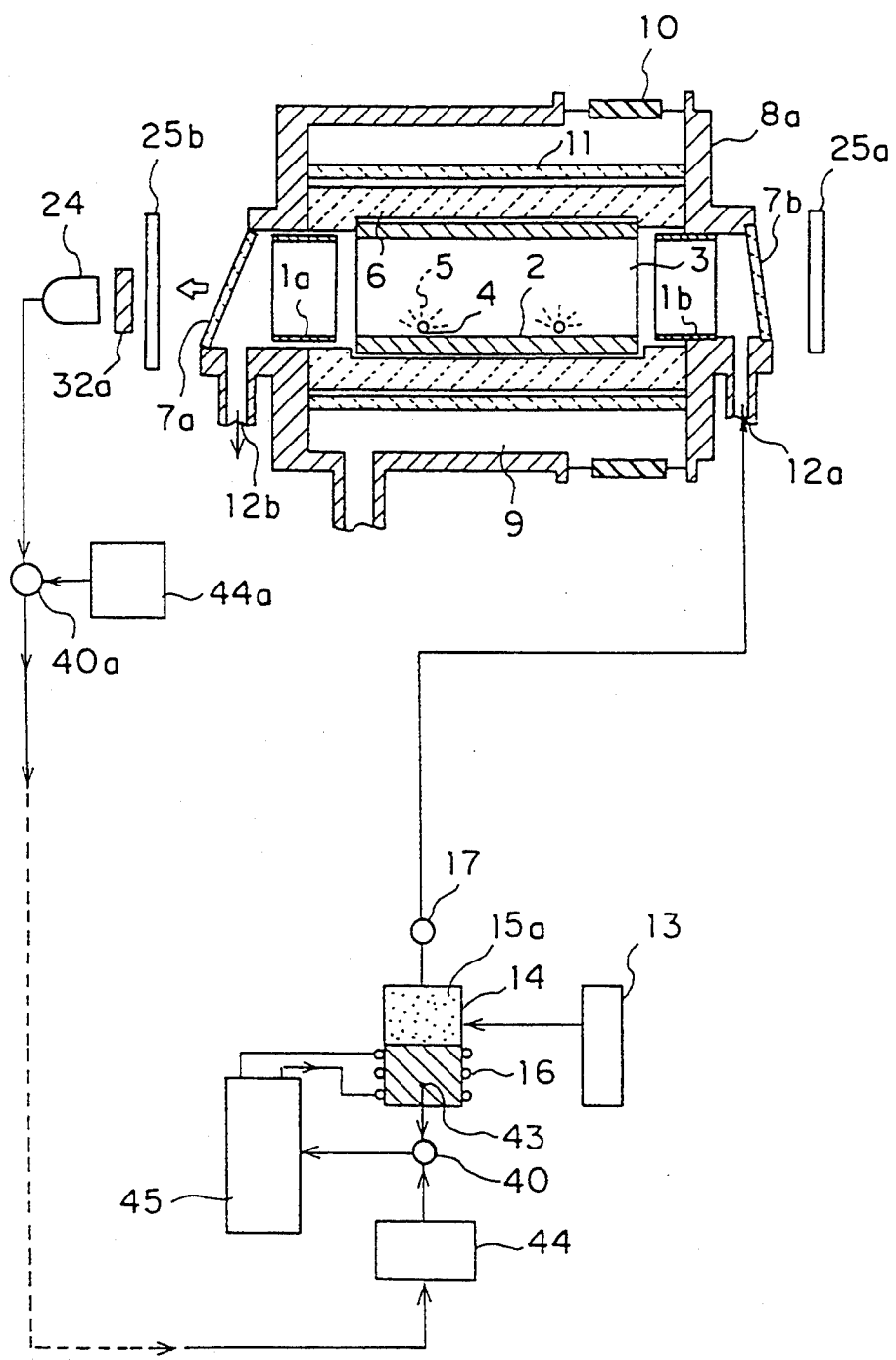
FIG. 28 is a diagrammatic view showing a major portion of a pulse laser apparatus according to a twenty-sixth embodiment of the fourteenth aspect of the present invention.

An embodiment of the fourteenth aspect of the present invention will be described. FIG. 28 shows the embodiment. Reference numeral 24 denotes a laser power detector, and 32a a particular wavelength selecting filter for selectively detecting only light of a particular wavelength (for example, 510 nm) of laser light. Subsequently, the background of the embodiment shown in FIG. 28 will be described. A copper vapor laser provides two kinds of laser light which have the wavelengths of 510 nm and 578 nm, and that one of the two kinds of laser light which is effective to excite coloring matter laser of the embodiment has the particular wavelength of 510 nm. Consequently, there is a problem that, even if the laser output of the copper vapor laser apparatus increases and consequently the output of laser light having the wavelength of 578 nm increases, the coloring matter laser cannot be excited effectively. Therefore, such control as seen from FIG. 28 is effected in order to increase the laser output of the particular laser wavelength. In short, the laser light is passed through the particular wavelength selecting filter 32a to detect the intensity of light only of the particular wavelength by means of the detector, and the amount of vapor of molecules consisting of a plurality of elements such as water in the gas is controlled in accordance with a signal from the detector. With the construction, the laser output only of the particular wavelength can be increased. While the amount of vapor of molecules consisting of a plurality of elements such as water in the gas is controlled in accordance with the laser intensity of the particular wavelength of 510 nm as an embodiment here, alternatively the light of the wavelength of 578 nm may be detected and the amount of water vapor in the gas may be controlled so that the intensity of the laser light of the wavelength of 578 nm may be decreased while the total laser output of the laser light of the wavelengths of 510 nm and 578 nm is increased. Further, such control as in the eighth aspect of the present invention may be effected by combination of a signal of the laser output of a particular wavelength and a signal value of a pulse current, a voltage, a temperature of the discharge tube or the like.

Embodiment 14

Figure 29:
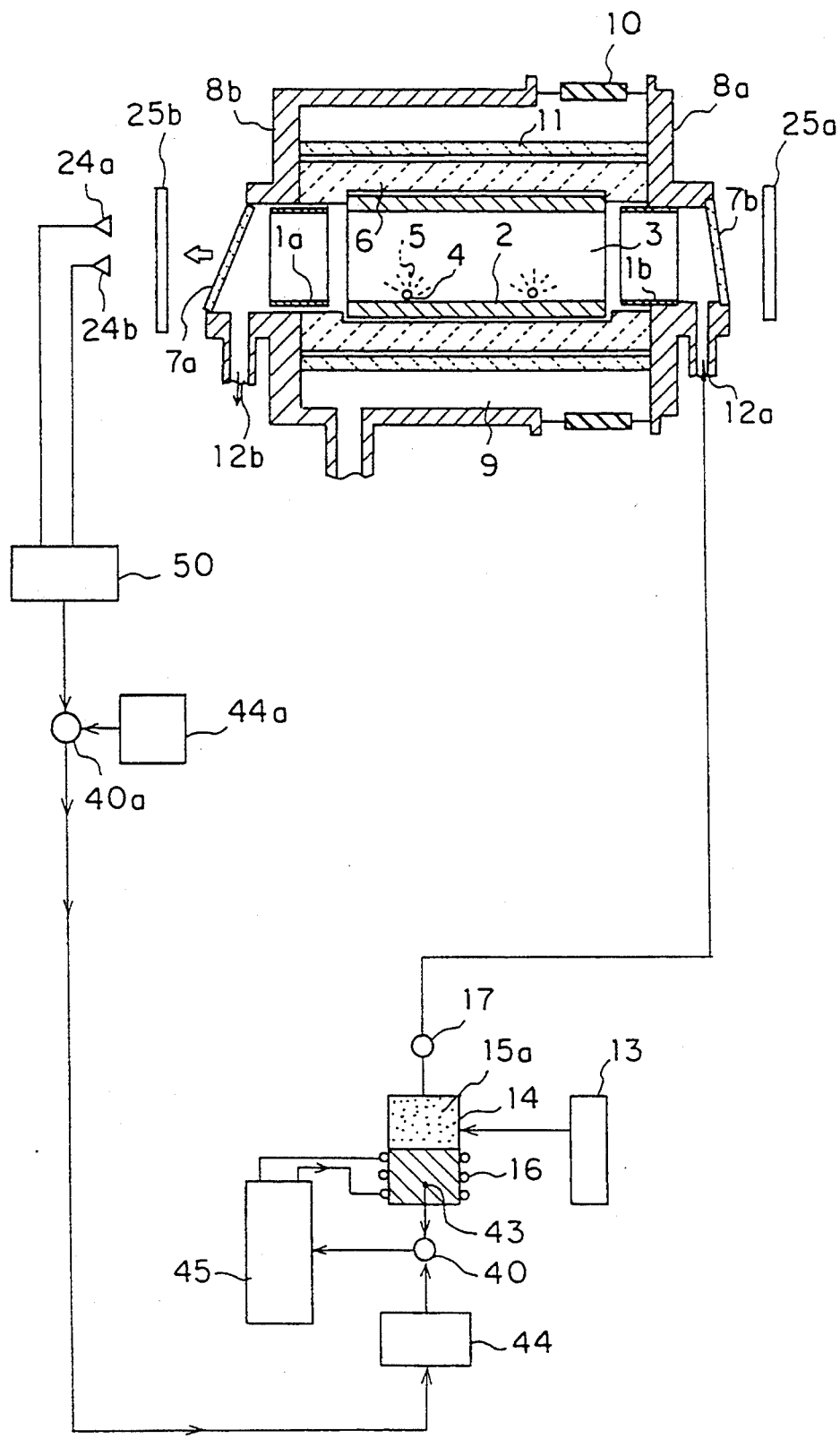
FIG. 29 is a diagrammatic view showing a major portion of a pulse laser apparatus according to a twenty-seventh embodiment of the fifteenth aspect of the present invention.

An embodiment of the fifteenth aspect of the present invention will be described. FIG. 29 shows the embodiment. Reference character 24a denotes a detector for detecting the concentration of the laser output in the proximity of a wall of a discharge tube, 24b another detector for detecting the concentration of the laser output in the proximity of the center of the discharge tube, and 50 a gradient calculator. Subsequently, the background and operation of the embodiment shown in FIG. 29 will be described. One of means for enhancing the quality of a laser beam of a laser apparatus which is a request from various application fields such as a laser working apparatus is to minimize the difference between the laser output concentration in the proximity of a wall of a discharge tube and the laser output concentration in the proximity of the center of the discharge to uniform the laser output concentration as far as possible in the discharge tube. In the present apparatus, in order to uniform the laser output in a radial direction, the laser output concentration in the proximity of the wall of the discharge tube and the laser output concentration in the proximity of the center of the discharge tube are detected, and the thus detected signals are input to the gradient calculator 50. The gradient calculator 50 calculates a gradient in a radial direction between the laser output concentration in the proximity of the wall of the discharge tube and the laser output concentration in the proximity of the center of the discharge tube and feeds back the thus calculated gradient to a temperature setter 44 in order to control the amount of vapor of molecules consisting of a plurality of elements such as water contained in the buffer gas. In a concrete method of the feedback control in the present embodiment, if the gradient at the gradient calculator 50 between the laser output concentrations in the proximity of the wall and in the proximity of the center of the discharge tube increases, then the set temperature of the gas temperature setter 44 is raised to increase the amount of evaporation of molecules consisting of a plurality of elements in the buffer gas.

Embodiment 15

Figure 31:
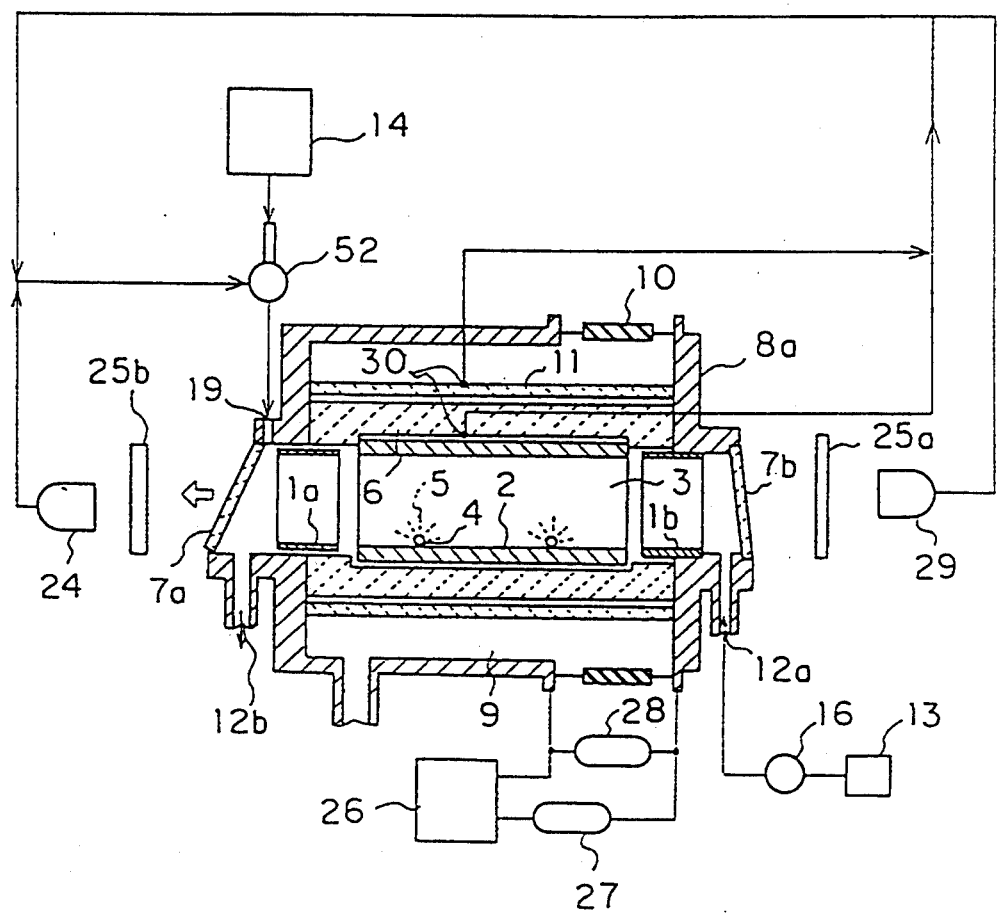
FIG. 31 is a diagrammatic view showing a major portion of a pulse laser apparatus according to a twenty-ninth embodiment of the sixteenth aspect of the present invention.

An embodiment of the sixteenth aspect of the present invention will be described. Referring to FIGS. 30A and 30B, the laser output, the discharge current, the discharge voltage or the tube wall temperature is detected, and the flow rate controlling apparatus 20 is controlled in accordance with a variation of the detected signal so that, upon stopping of laser oscillation, supply of water vapor to the discharge tube is stopped. Meanwhile, in FIG. 31, a substance 15a for generating water vapor from cooling water for electrodes and so forth of a discharge tube is supplied, and a valve controlling apparatus 52 is provided which automatically closes an inlet port 19 at one of the electrodes of the discharge tube in accordance with a variation of the detected signal. Since mixture of excessive water vapor into the discharge tube upon stopping of laser oscillator can be prevented, also when laser oscillator is started again, a stable laser output can be obtained.

It is to be noted that, while description is given hereinabove of a copper vapor laser apparatus, similar effects to those described above are exhibited also with a metal vapor laser apparatus and an excimer laser apparatus. For example, in the case of an excimer laser apparatus, if the repeat frequency of excitation pulses is increased, then the electric input energy used for discharging is increased, and consequently, the resistance to discharging for a pulse on period is decreased. In this instance, by mixing water vapor or water vapor and hydrogen into laser gas, the resistance of the laser medium for a pulse on period and a pulse off period can be raised to increase the discharge voltage.

As described so far, according to the first aspect of the present invention, since a pulse laser apparatus wherein buffer gas and copper vapor are enclosed in a tube and the gas is utilized as an excitation or ionization medium in the tube comprises molecules consisting of a plurality of elements and mixed by 0.1 percent or more in the gas enclosed in the tube, it has the effects that the laser output can be increased readily, the laser output distribution can be made uniform in a radial direction and the apparatus is stabilized.

Meanwhile according to the second aspect of the present invention, since a pulse laser apparatus comprises molecules consisting of a plurality of elements and mixed by 0.1 percent or more in gas enclosed in a tube and gas of light atoms mixed by 0.1 percent or more in the gas enclosed in the tube, it has the effect, in addition to those of the pulse laser apparatus of the first aspect that the laser output can be further increased, that the laser output distribution can be made further uniform in a radial direction and that the apparatus is further stabilized.

According to the third aspect of the present invention, since it is constructed such that, in the first and second aspects, a substance in which molecules consisting of a plurality of elements or gas of light atoms is impregnated is disposed in the tube as means for mixing the molecules consisting of a plurality of elements or the gas of light atoms into the buffer gas, it has the effect that the water or the like can be mixed readily from the substance in which it is impregnated into the tube and that the laser output can be increased at a low cost.

According to the fourth aspect of the present invention, since a vessel in which liquid in the form of molecules consisting of a plurality of elements is contained is disposed on a route for supplying the gas into the tube so that the gas may be supplied into the tube by way of the vessel, it has the effect that water vapor can be mixed readily into the gas and that an inexpensive vessel can be incorporated into the apparatus.

According to the fifth aspect of the present invention, since the liquid in the vessel is automatically supplemented in the fourth aspect, it has the effect that a high laser output can be obtained continuously without stopping the operation of the apparatus.

According to the sixth aspect of the present invention, since means for controlling the amount of molecules consisting of a plurality of elements of the amount of gas of light elements in the gas is provided on a route for supplying the gas into the tube, it has the effects that the laser output can be adjusted readily and that the stability of the laser output is enhanced.

According to the seventh aspect of the present invention, since, in the sixth aspect, a detector for detecting the amount of impurity gas other than the gas enclosed in the tube is provided in the tube or at an exit for the gas in the tube, and the detected amount of impurity gas in the gas is fed back to means for controlling the amount of vapor of molecules consisting of a plurality of elements or the amount of gas of light atoms in the gas enclosed in the tube in accordance with an increase or decrease of the detected amount of impurity gas in the gas, it has the effect that a drop of the laser output caused by impurity gas can be prevented.

According to the eighth aspect of the present invention, since, in the sixth aspect, a laser output, a discharge current, a discharge voltage or an internal temperature of the tube is detected and is fed back to means for controlling the amount of vapor of molecules consisting of a plurality of elements or the amount of gas of light atoms in the gas enclosed in the tube in accordance with a value of difference between the detected signal value and a preset aimed value, the laser output can be compensated for a drop thereof arising from deterioration of a part of the apparatus caused by operation of the apparatus for a long period of time, and the laser output can be further stabilized.

According to the ninth aspect of the present invention, since, in the first or secodn aspect, the means for cooling the inside of the tube serves also as means for supplying molecules consisting of a plurality of elements into the tube, it has the effect that the apparatus can be made further compact and can be produced at a further reduced cost.

According to the tenth aspect of the present invention, since it comprises a pipe provided in a tube and having a hole formed in a side face thereof and means for supplying gas in the form of a mixture of buffer gas of the first or second aspect with molecules consisting of a plurality of elements or gas of light atoms into the tube through the hole of the pipe, it has the effects that the laser output is increased and that the quality of a laser beam in a radial direction can be enhanced.

According to the eleventh aspect of the present invention, since it comprises means for supplying gas in the form of a mixture of buffer gas with molecules consisting of a plurality of elements or gas of light atoms into the tube by way of one or a plurality of inlet ports formed at a central portion of the tube in its axial direction, it has the effect that deterioration of the laser output at a central portion of the tube is prevented.

According to the twelfth aspect of the present invention, since, in the tenth aspect, it further comprises a pipe provided at a central portion in the tube in its radial direction and having a hole formed in a side face thereof and means for supplying gas in the form of a mixture of buffer gas with molecules consisting of a plurality of elements or gas of light atoms into the tube through the hole of the pipe, it has the effects that the laser output in the proximity of the center of the tube is raised and that the quality of a laser beam is enhanced.

According to the thirteenth aspect of the present invention, since it comprises means for detecting an intensity of light emitted by discharging and means for controlling the amount of vapor of molecules consisting of a plurality of elements or the amount of gas of light atoms in the gas enclosed in the tube in accordance with an intensity of light having a wavelength in the proximity of an oscillation frequency of the laser apparatus, it has the effect that the laser output can be increased and further stabilized.

According to the fourteenth aspect of the present invention, since it comprises means for detecting a laser output only of the laser wavelength of 510 nm and means for controlling the amount of vapor of molecules consisting of a plurality of elements or the amount of gas of light atoms in the gas enclosed in the tube in accordance with an increase or decrease of the detected signal value, it has the effect that the laser output only of the selected particular laser wavelength is increased and the stability of the laser output is enhanced.

According to the fifteenth aspect of the present invention, since it comprises means for detecting intensities of a laser output at least at two different points in a radial direction and means for controlling the amount of vapor of molecules consisting of a plurality of elements or the amount of gas of light atoms in the gas enclosed in the tube in accordance with an increase or decrease of a gradient of the detected laser output intensities in the radial direction, it has the effect that the laser output distribution in the radial direction can be further enhanced.

According to the sixteenth aspect of the present invention, since it comprises means for stopping mixture of vapor of molecules consisting of a plurality of elements upon stopping of the apparatus or upon stopping of laser oscillation and/or means for stopping supply of the gas into the discharge tube upon stopping of laser oscillation, it has the effect that, when laser oscillation is to be performed again, the laser output is returned to a stabilized laser output level further rapidly.

What is claimed is:

1. A metal vapor laser apparatus comprising:
    a tube;
    a metal vapor laser medium enclosed in said tube;
    a buffer gas enclosed in said tube, said buffer gas being utilized as an excitation medium to excite said metal vapor laser medium;
    molecules consisting of a plurality of elements, said molecules absorbing heat from the buffer gas, said molecules being added to said buffer gas in an amount of at least 0.1 percent.

2. A metal vapor laser apparatus according to claim 1, further comprising a vessel, in which a liquid made up of said molecules consisting of a plurality of elements is contained, disposed on a path along which the buffer gas is supplied into said tube wherein the buffer gas is supplied into said tube by way of said vessel.

3. A metal vapor laser apparatus according to claim 2, further comprising means for producing and controlling an amount of a vapor of said molecules consisting of a plurality of elements from said liquid, said means for producing and controlling connected to said vessel.

4. A metal vapor laser apparatus according to claim 3, further comprising a detector for detecting an amount of impurity gas, other than the buffer gas enclosed in said tube, which is disposed in said tube, and means for feeding back a signal indicative of the detected amount of impurity gas in the buffer gas to said means for producing and controlling amount of said vapor in the buffer gas enclosed in said tube, wherein said means for producing and controlling controls the amount of said vapor in response to the detected amount of impurity gas in the buffer gas.

5. A metal vapor laser apparatus according to claim 3, further comprising:
   means for detecting a parameter value of said tube;
   means for comparing the detected parameter value to a preset desired parameter value and generating a difference signal representing a difference value between the detected parameter value and the preset desired parameter value; and
   means for feeding back the difference signal to said means for producing and controlling which controls the amount of vapor of molecules consisting of a plurality of elements responsive to the difference signal,
   wherein said parameter value is selected from the group consisting of a laser power output value, a current value, a voltage value and a discharge tube wall temperature value.

6. A metal vapor laser apparatus according to claim 1, further comprising means for detecting a laser output only of a particular laser wavelength, and means for controlling an amount of vapor of said molecules in the buffer gas enclosed in said tube in accordance with the detected laser output.

7. A metal vapor laser apparatus comprising:
   a tube;
   a metal vapor laser medium enclosed in said tube;
   a buffer gas enclosed in said tube, said buffer gas being utilized as an excitation medium to excite said metal vapor laser medium;
   molecules consisting of a plurality of elements said molecules absorbing heat from the buffer gas, said molecules being added to said buffer gas in an amount of at least 0.1 percent; and
   a gas having a molecular weight lighter than neon added to said buffer gas in an amount of at least 0.1 percent.

8. A metal vapor laser apparatus according to claim 7, further comprising means for mixing said molecules consisting of a plurality of elements into the buffer gas, said means for mixing comprising means for disposing a gas absorbing member and impregnated with said molecules consisting of a plurality of elements in said tube.

9. A metal vapor laser apparatus according to claim 7, further comprising a vessel, in which liquid in the form of said molecules consisting of a plurality of elements is contained, disposed on a path along which the buffer gas is supplied into said tube wherein the buffer gas is supplied into said tube by way of said vessel.

10. A metal vapor laser apparatus according to claim 9, further comprising means for producing and controlling an amount of vapor of said molecules consisting of a plurality of elements from said liquid, said means for producing and controlling being connected to said vessel.

11. A metal vapor laser apparatus according to claim 10, further comprising a detector for detecting an amount of impurity gas, other than the buffer gas enclosed in said tube, which is disposed in said tube, and means for feeding back a signal indicative of the detected amount of impurity gas in the buffer gas to said means for producing and controlling the amount of said vapor in the buffer gas enclosed in said tube, wherein said means for producing and controlling controls the amount of said vapor in response to the detected amount of impurity gas in the buffer gas.

12. A metal vapor laser apparatus according to claim 10, further comprising:
   a vessel, in which liquid in the form of said molecules consisting of a plurality of elements is contained, disposed on a path along which the buffer gas is supplied into said tube wherein the buffer gas is supplied into said tube by way of said vessel;
   means for producing and controlling an amount of a vapor of said molecules consisting of a plurality of elements from said liquid, said means for producing and controlling connected to said vessel; and
   a detector for detecting an amount of impurity gas, other than the buffer gas enclosed in said tube, which is disposed in said tube, and means for feeding back a signal indicative of the detected amount of impurity gas in the buffer gas to said means for producing and controlling the amount of said vapor in the buffer gas enclosed in said tube, wherein said means for producing and controlling controls the amount of vapor in response to the detected amount of impurity gas in the buffer gas.

13. A metal vapor laser apparatus according to claim 10, further comprising:
   means for detecting a parameter value of said tube;
   means for comparing the detected parameter value to a preset desired parameter value and generating a difference signal representing a difference value between the detected parameter value and the preset desired parameter value; and
   means for feeding back the difference signal to said means for producing and controlling which controls the amount of vapor of molecules consisting of a plurality of elements responsive to the difference signal;
   wherein said parameter value is selected from the group consisting of a laser power output value, a discharge current value, a discharge voltage value and a tube wall temperature value.

14. A metal vapor laser apparatus according to claim 7, further comprising means for detecting a laser output only of a particular laser wavelength, and means for controlling an amount of vapor of said molecules in the buffer gas enclosed in said tube in accordance with the detected laser output.

15. A metal vapor laser apparatus according to claim 7, further comprising means for mixing a gas having a molecular weight lighter than neon into the buffer gas, said mixing means comprising means for disposing a gas absorbing member and a gas having a molecular weight lighter than neon in said tube.

16. A metal vapor laser apparatus according to claim 15, further comprising:
   means for controlling the amount of gas having a molecular weight lighter than neon, said means disposed on a path along which the gas is supplied into said tube;
   means for detecting a parameter value of said tube;
   means for comparing the detected parameter value to a preset desired parameter value and generating a difference signal representing a difference value between the detected parameter value and the preset desired parameter value; and means for feeding back the difference signal to said means for controlling which controls the amount of gas having a molecular weight lighter than neon the difference signal, wherein said parameter value is selected from the group consisting of a laser power output value, a discharge current value, a discharge voltage value and a tube wall temperature value.

17. A metal vapor laser apparatus according to claim 16, further comprising a detector for detecting an amount of impurity gas other than the gas enclosed in said tube, and means for feeding the detected amount of impurity gas in the gas back to said means for controlling the amount of gas having a molecular weight lighter than neon in the buffer gas enclosed in said tube in accordance with the detected amount of impurity gas in the buffer gas.

18. A metal vapor laser apparatus according to claim 15, further comprising a detector for detecting an amount of impurity gas other than the gas enclosed in said tube, and means for feeding the detected amount of impurity gas in the buffer gas back to said means for controlling the amount of gas having a molecular weight less than neon in the buffer gas enclosed in said tube in accordance with the detected amount of impurity gas in the buffer gas.

19. A metal vapor laser apparatus according to claim 7, further comprising:

means for controlling the amount of gas having a molecular weight lighter than neon, said means disposed on a path along which the buffer gas is supplied into said tube;

means for detecting a parameter value of said tube;

means for comparing the detected parameter value to a preset desired parameter value and generating a difference signal representing a difference value between the detected parameter value and the preset desired parameter value; and means for feeding back the difference signal to said means for controlling which controls the amount of gas having a molecular weight lighter than neon responsive to the difference signal;

wherein said parameter value is selected from the group consisting of a laser power output value, a discharge current value, a discharge voltage value and a tube wall temperature value.

20. A metal vapor laser apparatus according to claim 7, further comprising means for detecting a laser output only of a particular laser wavelength, and means for controlling the amount of a gas having a molecular weight lighter than that of neon in the buffer gas enclosed in said tube in accordance with the detected signal value.

21. A metal vapor laser apparatus comprising:
a tube;
a metal vapor laser medium enclosed in said tube;
a buffer gas enclosed in said tube, said buffer gas being utilized as an excitation medium to excite said metal vapor laser medium;
means for detecting an intensity of discharge light emitted by said apparatus; and
means, responsive to said means for detecting, for controlling an amount of vapor of molecules consisting of a plurality of elements in the buffer gas enclosed in said tube responsive to a detected intensity of light having a wavelength in the proximity of an oscillation frequency of said laser apparatus.

22. A metal vapor laser apparatus comprising:
a tube;
a metal vapor laser medium enclosed in said tube;
a buffer gas enclosed in said tube, said buffer gas being utilized as an excitation medium to excite said metal vapor laser medium;
means for detecting intensities of a laser output at least at two different points in a radial direction with respect to said tube; and
means for controlling an amount of vapor molecules consisting of a plurality of elements in the buffer gas enclosed is said tube in accordance with a gradient of the detected laser output intensities in the radial direction.

23. A metal vapor laser apparatus comprising:
a tube;
a metal vapor laser medium enclosed in said tube;
a buffer gas enclosed in said tube, said buffer gas being utilized as an excitation medium to excite said metal vapor laser medium;
a pipe provided in said tube and having a hole formed in a side face of said pipe; and
means for supplying gas in the form of a mixture of said buffer gas with a gas having a molecular weight lighter than that of neon into said tube through said hole of said pipe.

24. A metal vapor laser apparatus comprising:
a tube;
a metal vapor laser medium enclosed in said tube;
a buffer gas enclosed in said tube, said buffer gas being utilized as an excitation medium to excite said metal vapor laser medium;
means for supplying gas in the form of a mixture of said buffer gas with a gas having a molecular weight lighter than that of neon into said tube by way of at least one inlet port formed at a central portion of said tube in its axial direction.

25. A metal vapor laser apparatus acacording to claim 24, wherein said at least one inlet port comprises a plurality of inlet ports.

26. A metal vapor laser apparatus comprising:
a tube;
a metal vapor laser medium enclosed in said tube;
a buffer gas enclosed in said tube, said buffer gas being utilized as an excitation medium to excite said metal vapor laser medium;
a pipe provided at a central portion in said tube in its radial direction and having a hole formed in a side face thereof; and
means for supplying gas in the form of a mixture of said buffer gas with a gas having a molecular weight lighter than that of neon into said tube through said hole of said pipe.

27. A metal vapor laser apparatus comprising:
a tube;
a metal vapor laser medium enclosed in said tube;
a buffer gas enclosed in said tube, said buffer gas being utilized as an excitation medium to excite said metal vapor laser medium;
means for detecting an intensity of discharge light emitted by said apparatus; and
means for controlling the amount of a gas having a molecular weight lighter than that of neon in the gas enclosed in said tube in accordance with an intensity of light having a wavelength in the proximity of an oscillation frequency of said laser apparatus.

28. A metal vapor laser apparatus comprising:
- a tube;
- a laser medium enclosed in said tube;
- a buffer gas enclosed in said tube, said buffer gas being utilized as an excitation medium to excite said metal vapor laser medium;
- means for detecting intensities of a laser output at least at two different points in a radial direction with respect to said tube; and
- means for controlling the amount of a gas having a molecular weight lighter than that of neon in the buffer gas enclosed in said tube in accordance with a gradient of the detected laser output intensities in the radial direction.

* * * * *